(12) United States Patent
Shibuya et al.

(10) Patent No.: US 10,744,574 B2
(45) Date of Patent: Aug. 18, 2020

(54) MILLING CUTTER, CUTTING INSERT, AND MILLING METHOD

(71) Applicant: Ahresty Corporation, Toyohashi-Shi, Aichi (JP)

(72) Inventors: Jyunichiro Shibuya, Ogaki (JP); Masaaki Hasegawa, Anpachi-gun (JP); Koji Tatsuta, Toyohashi (JP)

(73) Assignee: Ahresty Corporation, Toyohashi-Shi, Aichi (JP)

( * ) Notice: Subject to any disclaimer, the term of this patent is extended or adjusted under 35 U.S.C. 154(b) by 128 days.

(21) Appl. No.: 16/091,491

(22) PCT Filed: Jan. 16, 2017

(86) PCT No.: PCT/JP2017/001183
§ 371 (c)(1),
(2) Date: Oct. 4, 2018

(87) PCT Pub. No.: WO2017/175440
PCT Pub. Date: Oct. 12, 2017

(65) Prior Publication Data
US 2019/0118272 A1    Apr. 25, 2019

(30) Foreign Application Priority Data

Apr. 7, 2016   (JP) ................. 2016-077407

(51) Int. Cl.
*B23C 3/30* (2006.01)
*B23C 5/06* (2006.01)
(Continued)

(52) U.S. Cl.
CPC .............. *B23C 3/30* (2013.01); *B23C 3/34* (2013.01); *B23C 5/06* (2013.01); *B23C 5/20* (2013.01);
(Continued)

(58) Field of Classification Search
CPC .... B23C 3/30; B23C 3/32; B23C 3/34; B23C 5/06; B23C 5/20; B23C 5/207;
(Continued)

(56) References Cited

U.S. PATENT DOCUMENTS 2,367,221 A * 1/1945 Kraus .................. B23C 5/242
407/39
5,056,963 A * 10/1991 Kameno .............. B23B 27/145
29/90.01
(Continued)

FOREIGN PATENT DOCUMENTS

| CN | 101704175 A | 5/2010 |
| CN | 102078985 A | 6/2011 |

(Continued)

OTHER PUBLICATIONS

First Office Action for Chinese Application No. 2017800222117, dated Dec. 23, 2019.
(Continued)

*Primary Examiner* — Alan Snyder
*Assistant Examiner* — Yasir A Diab
(74) *Attorney, Agent, or Firm* — Wolf, Greenfield & Sacks, P.C.

(57) ABSTRACT

Provided is a milling cutter including: a tool body to rotate about an axis; and cutting edges at an outer peripheral part of a front end of the tool body, wherein the cutting edges include a flat face machining cutting edge extending along a virtual plane perpendicular to the axis, and a recessed groove machining cutting edge projecting further toward a front end side in the axial direction than the flat face machining cutting edge, and the recessed groove machining cutting edge has a first inclined portion extending toward the front end side in the axial direction toward an outside in a radial direction, a second inclined portion arranged outside
(Continued)

the first inclined portion in the radial direction and extending toward a base end side in the axial direction toward the outside in the radial direction, and a tip portion connecting the first and second inclined portions.

5 Claims, 18 Drawing Sheets

(51) Int. Cl.
*B23C 5/20* (2006.01)
*B23C 5/24* (2006.01)
*B23C 3/34* (2006.01)

(52) U.S. Cl.
CPC ............ *B23C 5/207* (2013.01); *B23C 5/2472* (2013.01); *B23C 2200/205* (2013.01); *B23C 2215/08* (2013.01); *B23C 2220/36* (2013.01); *B23C 2222/04* (2013.01); *B23C 2226/125* (2013.01); *B23C 2226/315* (2013.01)

(58) Field of Classification Search
CPC ........ B23C 2210/285; B23C 2210/287; B23C 2200/205; B23C 2220/36
See application file for complete search history.

(56) References Cited

U.S. PATENT DOCUMENTS

| | | | | |
|---|---|---|---|---|
| 5,382,118 | A * | 1/1995 | Satran | B23C 5/06 407/42 |
| 5,718,540 | A * | 2/1998 | Satran | B23C 5/2221 407/42 |
| 6,322,296 | B1 * | 11/2001 | Wetli | B23C 3/30 407/42 |
| 6,343,902 | B1 * | 2/2002 | Nishikawa | B23C 3/02 407/31 |
| 6,530,726 | B2 * | 3/2003 | Nelson | B23C 5/202 407/114 |
| 6,669,412 | B1 * | 12/2003 | Hirose | B23C 5/2221 407/113 |
| 2003/0010201 | A1 * | 1/2003 | Takahashi | C23C 4/02 92/169.1 |
| 2003/0133763 | A1 * | 7/2003 | Kuroda | B23C 5/00 407/40 |
| 2005/0044707 | A1 * | 3/2005 | Izquierdo | C23C 4/02 29/888.061 |
| 2008/0145166 | A1 | 6/2008 | Lin et al. | |
| 2009/0290946 | A1 * | 11/2009 | Zastrozynski | B23B 27/141 407/114 |
| 2010/0047026 | A1 * | 2/2010 | Horiike | B23C 5/109 407/40 |
| 2010/0101526 | A1 * | 4/2010 | Schaefer | B23P 9/02 123/193.2 |
| 2013/0294851 | A1 * | 11/2013 | S Gstrom | B23C 5/2273 407/48 |
| 2014/0161545 | A1 * | 6/2014 | Inagaki | B23B 27/1603 407/42 |

FOREIGN PATENT DOCUMENTS

| | | |
|---|---|---|
| CN | 104475841 A | 4/2015 |
| EP | 1 997 577 A3 | 8/2010 |
| JP | 57-034314 U | 2/1982 |
| JP | 60-172619 U | 11/1985 |
| JP | 62-172512 U | 11/1987 |
| JP | 03-055112 U | 5/1991 |
| JP | 2002-254233 A | 9/2002 |
| JP | 2006-205298 A | 8/2006 |
| JP | 2012-171040 A | 9/2012 |
| JP | 5579100 B | 8/2014 |
| JP | 2014-184550 A | 10/2014 |
| JP | 2015-027707 A | 2/2015 |
| JP | 2015-027708 A | 2/2015 |
| KR | 10-1348459 B1 | 1/2014 |
| TW | 201008681 A | 3/2010 |

OTHER PUBLICATIONS

International Search Report dated Mar. 21, 2017 in connection with Application No. PCT/JP2017/001183.
Office Action for Indian Application No. 201837039783, dated Mar. 17, 2020.
IN201837039783, Mar. 17, 2020, Office Action.

* cited by examiner

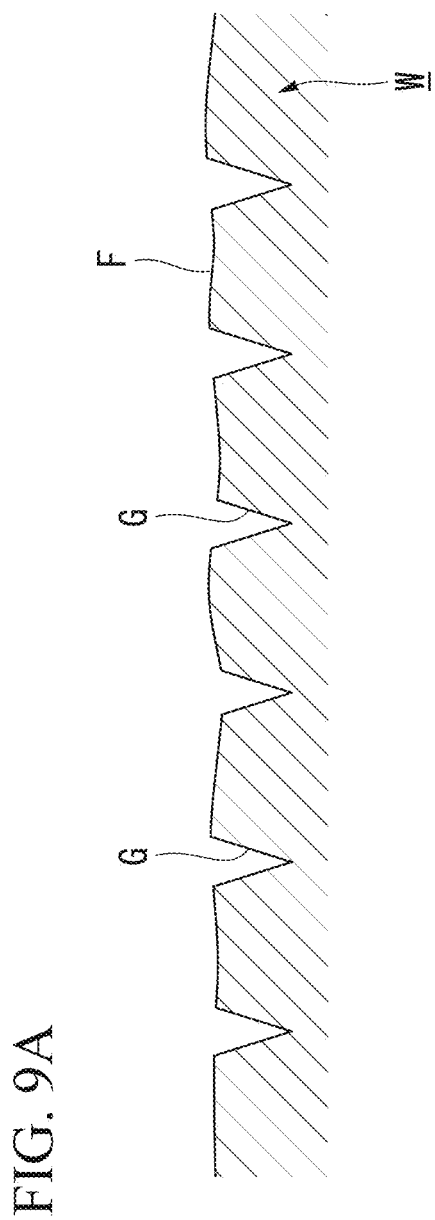

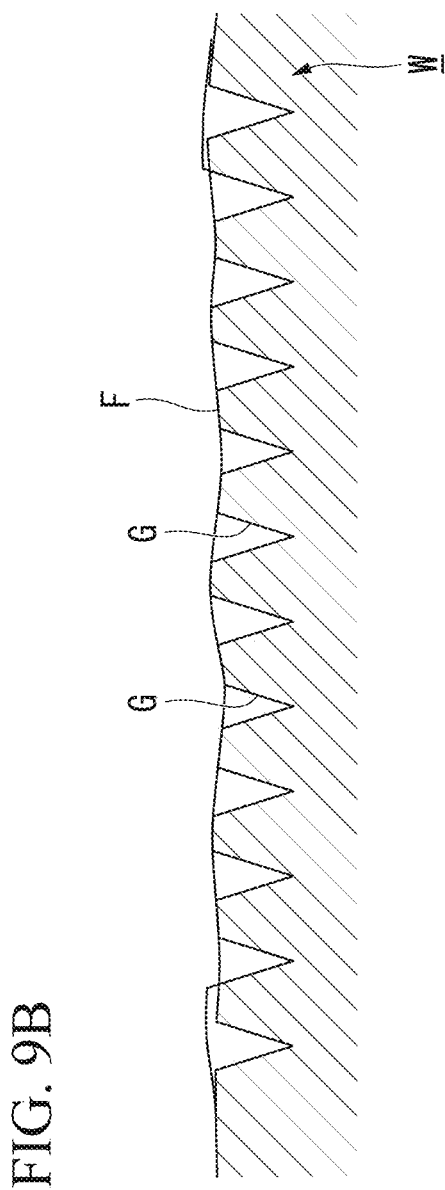

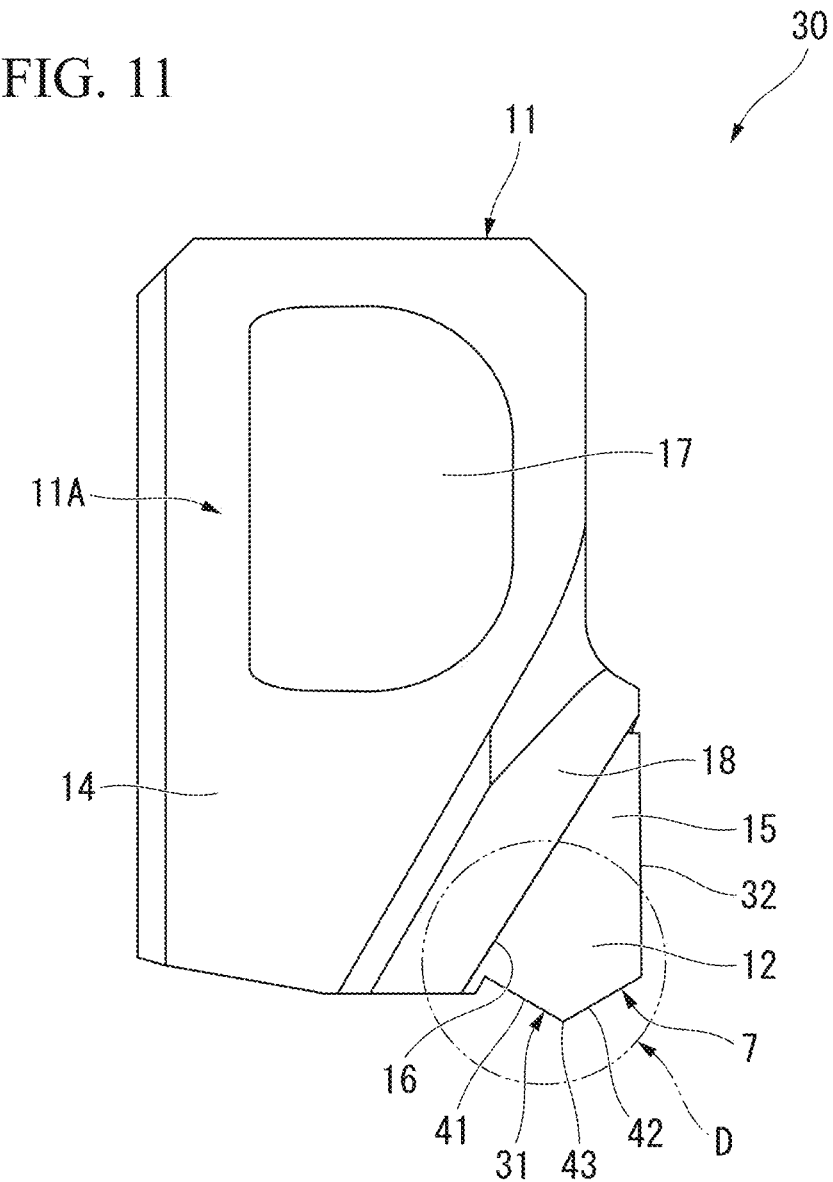

MILLING CUTTER, CUTTING INSERT, AND MILLING METHOD

TECHNICAL FIELD

The present invention relates to a milling cutter, a cutting insert, and a milling method capable of performing a milling such that surface roughness of a work material falls within a prescribed range.

This application is a national stage filing under 35 U.S.C. § 371 of international application number PCT/JP2017/001183, filed Jan. 16, 2017, which claims the benefit under 35 U.S.C. § 119(e) of Japanese Patent Application No. 2016-77407, filed Apr. 7, 2016, the entire contents of each of which is incorporated herein by reference.

BACKGROUND ART

Conventionally, indexable milling cutters as described in the following Patent Literatures 1 and 2, for example, are known. Such an indexable milling center includes a tool body that is configured to rotate about an axis, a plurality of insert attachment seats that are formed at an outer peripheral part of a tip with intervals provided between one another in a circumferential direction, and cutting inserts that are respectively detachably attached to these insert attachment seats.

In addition, front edges (flat face machining cutting edges) for working a flat face in a working material are provided on the cutting inserts. The front edges are arranged to conform to a virtual plane that is perpendicular to the axis of the tool body when the cutting inserts are attached to the insert attachment seats. The machined surface of the work material, on which a milling has been performed by the front edges of the cutting inserts is finished as a smooth flat face.

Note that the indexable milling cutters described in Patent Literatures 1 and 2 are provided with adjustment mechanisms capable of adjusting the positions of the cutting inserts attached to the insert attachment seat in the axial direction. The adjustment mechanisms adjust the respective front edges of the plurality of cutting inserts such that they become positioned on one virtual plane that is perpendicular to the axis.

Incidentally, in a structure in which mating faces (flat faces formed into annular shapes along openings of case bodies) of a pair of case bodies are abutted to each other and are combined, such as a clutch housing or a transmission case for a vehicle, for example, a milling is performed in advance on the mating faces by milling cutter such as the aforementioned indexable milling cutter to form the faces into flat faces. Also, a sealing agent such as a liquid packing is interposed between these mating faces, thereby securing a sealing property.

It is preferable to apply surface roughness in a predetermined range, in which irregularities are formed to some extent rather than to form the mating faces as smooth flat faces, in order to maintain the sealing agent in the mating faces stably. That is, since a contact area with the sealing agent increases, a holding property of the sealing agent increases, a sealing effect becomes stable, and leakage or the like of the sealing agent due to vibration or the like tends not to occur due to the minute irregularities formed on the mating faces. Specifically, there may be a case in which not too fine and not too rough surface roughness (surface roughness that falls between a predetermined upper limit value and a lower limit value), for example, surface roughness in a predetermined range of Rz (10-point average roughness) of about several μm to several tens of μm is required for the surface roughness of a work material.

In order to realize such surface roughness in the related art, it is necessary to obtain mating faces (machined surfaces) with prescribed surface roughness by working a work material to obtain smooth flat faces first by using an indexable milling cutter and then appropriately scratching and damaging the flat faces by using a grindstone or the like in another process.

CITATION LIST

Patent Literature

[Patent Literature 1]
Japanese Unexamined Patent Application, First Publication No. 2015-27707
[Patent Literature 2]
Japanese Unexamined Patent Application, First Publication No. 2015-27708

SUMMARY OF INVENTION

Technical Problem

However, the manufacturing method of working a working material to obtain smooth flat faces by the indexable milling cutter and then damaging the flat faces by using a grindstone or the like in another process leads to a complicated manufacturing process and low production efficiency.

The present invention was made in view of such circumstances, and an object thereof is to provide a milling cutter, a cutting insert, and a milling method capable of precisely applying surface roughness in a prescribed range to a work material simply using a milling process without complicating manufacturing.

Solution to Problem

According to an aspect of the present invention, there is provided a milling cutter including: a tool body that is configured to rotate about an axis; and a plurality of cutting edges that are provided at an outer peripheral part of a front end of the tool body with intervals provided between one another in circumferential directions around the axis, wherein the plurality of cutting edges include a flat face machining cutting edge that extends along a virtual plane that is perpendicular to the axis, and a recessed groove machining cutting edge that projects further toward a front end side in the axial direction than the flat face machining cutting edge, and the recessed groove machining cutting edge has a first inclined portion that extends toward the front end side in the axial direction toward an outside in a radial direction that perpendicularly intersects the axis, a second inclined portion that is arranged outside the first inclined portion in the radial direction and extends toward a base end side in the axial direction toward the outside in the radial direction, and a tip portion that is configured to connect the first inclined portion and the second inclined portion.

According to an aspect of the present invention, there is provided a cutting insert for milling that is detachably attached to at least one or more of a plurality of insert attachment seats that are formed at an outer peripheral part of a front end of a tool body that is configured to rotate about an axis with intervals provided between one another in circumferential directions around the axis, the cutting insert including: an insert body that is attached to each of the insert attachment seats; and a cutting edge that is formed at an intersecting ridge line between a rake face and a flank face of the insert body and is arranged on the forefront end side of the insert body in the axial direction, wherein the cutting edge has a recessed groove machining cutting edge that projects toward a front side in the axial direction, and the recessed groove machining cutting edge has a first inclined portion that extends toward the front end side in the axial direction toward an outside in a radial direction that perpendicularly intersects the axis, a second inclined portion that is arranged outside the first inclined portion in the radial direction and extends toward a base end side in the axial direction toward the outside in the radial direction, and a tip portion that is configured to connect the first inclined portion and the second inclined portion.

According to an aspect of the present invention, there is provided a milling method including the steps of: providing a plurality of cutting edges at an outer peripheral part of a front end of a tool body that is configured to rotate about an axis with intervals provided between one another in a circumferential direction around the axis; performing milling on the work material by moving the tool body to the work material in a radial direction that perpendicularly intersects the axis while the tool body is rotated in the circumferential direction; forming a flat face on the work material by using a flat face machining cutting edge that extends along a virtual plane that is perpendicular to the axis among the plurality of cutting edges; and forming a recessed groove with a V-shaped section recessed from the flat face on the work material by using a recessed groove machining cutting edge that projects further toward a front end side in the axial direction than the flat face machining cutting edge among the plurality of cutting edges.

Although the present invention is similar to the milling cutter in the related art in that a smooth flat face is formed in a work material by milling, the present invention has a technical feature that not only a smooth flat face but also recessed grooves are formed in the flat face.

Specifically, the recessed groove machining cutting edge that projects toward the further tool front end side than the cutting edge (flat face machining cutting edge) that works the flat face is provided, and the recessed grooves with V-shaped sections are formed in the flat face of the work material by the first inclined portion and the second inclined portion of the recessed groove machining cutting edge. In addition, the depths of the plurality of recessed grooves recessed from the flat surface are substantially the same as one another (that is, the depth of the plurality of recessed grooves is constant). In this manner, a machined surface that has prescribed surface roughness that is surface roughness approximately corresponding to the distance (depth) between the flat face and a deepest portion of the recessed grooves is formed in the work material. Note that the sectional shapes of the deepest portion of the recessed grooves are sharp corner portions (obtuse angles, a right angle, and the like) or convex curved portions with small curvature radii corresponding to the shape of the tip portion that is configured to connect the first inclined portion and the second inclined portion of the recessed groove machining cutting edge.

That is, milling is performed on the work material to obtain the flat face as in the related art while milling is performed on the flat face to obtain the recessed grooves during the milling (same process) in the present invention. It is possible to precisely apply surface roughness within a prescribed range (predetermined range) to the machined surface (surface after milling) of the work material by such a simple and special method.

Specifically, it is possible to highly precisely form a machined surface with a surface roughness Rz (ten-point average roughness) within a predetermined range of approximately several μm to several tens of μm, for example, in the work material. That is, it is possible to set the surface roughness of the work material to fall within a required range of surface roughness that is not too fine and not too rough (surface roughness between a desired upper limit value and lower limit value). Also, it is possible to control (manage) the surface roughness of the work material.

Further, according to the present invention, cutting conditions such as cutting feeding, a working position, and the like have little influence. Therefore, it is possible to stably form the machined surface with the surface roughness within the prescribed range in the work material under various cutting conditions.

Therefore, it is preferable to apply the present invention to a milling of mating faces of a pair of case bodies, such as a clutch housing or a transmission case for a vehicle, for example. In this manner, it is possible to precisely apply prescribed surface roughness to the mating faces and to significantly enhance the holding property and the sealing effect of the sealing agent interposed between the mating faces.

In addition, since the recessed grooves with the V-shaped sections are formed by the first inclined portion and the second inclined portion of the recessed groove machining cutting edge, it is possible to stably form a plurality of recessed grooves with a constant shape. In addition, it is possible to make it easy to visually recognize that the recessed grooves have been formed in the machined surface of the work material after the milling. Note that from the viewpoint of enhancing visibility, it is preferable that the tip portion that is configured to connect the first inclined portion and the second inclined portion in the recessed groove machining cutting edge be formed into a sharper corner (an obtuse angle, a right angle, or the like) than the convex curved portion with a small curvature radius since the amount of reflection then increases.

According to the present invention, it is possible to precisely apply the surface roughness in the prescribed range to the work material simply using the milling without complicating the manufacturing as described above.

In addition, it is preferable in the aforementioned milling cutter that a plurality of flat face machining cutting edges are provided, and the recessed groove machining cutting edge projects toward the front end side in the axial direction relative to a flat face machining cutting edge at a forefront end that is positioned on a forefront end side in the axial direction among the plurality of flat face machining cutting edges.

In this case, the final height position of the flat face of the work material in the axial direction is decided when the milling is performed on the work material by the flat face machining cutting edge at the forefront end that is positioned on the forefront front end side in the axial direction among the plurality of flat face machining cutting edges provided in the milling cutter. In addition, the recessed groove machining cutting edge forms the recessed grooves with the predetermined depth in the flat face at this final height position. Therefore, the surface roughness of the machined surface formed in the work material becomes more precise and closer to a target value (center value) in the prescribed range.

In addition, it is preferable in the aforementioned milling cutter that among the circumferential directions, a direction in which the tool body is configured to rotate is defined as a tool rotational direction, and the flat face machining cutting edge at the forefront end is arranged to be adjacent to the recessed groove machining cutting edge in the tool rotational direction.

In this case, the recessed groove machining cutting edge is arranged immediately behind the flat face machining cutting edges (immediately behind the flat face machining cutting edge on the side opposite to the tool rotational direction) that are positioned at the tool forefront end. Therefore, the recessed groove machining cutting edge successively cuts into the flat face, and the recessed grooves are formed immediately after the final height position of the flat face of the work material in the axial direction is decided. Therefore, the depth of the recessed grooves tends to become a prescribed value, and the surface roughness of the machined surface formed in the work material also tends to become highly precise and closer to the target value.

Theoretically, the aforementioned effect should be obtained as long as the amount of projection (hereinafter, referred to as the projection amount) of the cutting edge toward the front end side in the axial direction of the recessed groove machining cutting edge relative to the flat face machining cutting edges at the forefront end is precisely set even if the position of the recessed groove machining cutting edge in the tool body in the circumferential direction is not arranged in the vicinity of the flat face machining cutting edge at the forefront end in the circumferential direction. However, since deformation in accordance with stiffness of the milling cutter, a measurement error at the time of setting, and the like occurs in practice, there may also be a case in which it is difficult to precisely set the projection amount. Thus, variations in setting, displacement due to deformation, and the like are suppressed, and the precision of the projection amount is stabilized by arranging the recessed groove machining cutting edge immediately behind the flat face machining cutting edges (immediately behind the flat face machining cutting edges on the side opposite to the tool rotational direction) that are located at the tool forefront end in the aforementioned milling cutter. That is, it is desirable that the recessed groove machining cutting edge be arranged in the vicinity of the flat face machining cutting edges at the forefront end in the circumferential direction in consideration of stability of the working precision.

Specifically, there is typically a case in which the axis of the tool body is not perpendicular to the face to be machined (the face that is to be subjected to the milling) of the work material and is arranged to be slightly inclined (there is a case in which a so-called heel angle is applied thereto) in the milling cutter. Also, the depth of the recessed grooves from the flat face deviates from the prescribed value (range) in many cases if there is deflection (deflection from the flat face to be machined) of a spindle (main axis).

Meanwhile, according to the aforementioned configuration of the milling cutter, it is possible to reliably suppress influences of the inclination of the axis of the tool body, the deflection, and the like on quality of the worked product since the recessed groove machining cutting edge successively cut into the flat face immediately after the flat face machining cutting edges at the forefront end, even if the heel angle is applied to the tool body or there is deflection in the spindle.

In addition, it is preferable in the aforementioned milling cutter that the recessed groove machining cutting edge is arranged within a range of a length in the radial direction or inside in the radial direction, of the rotational locus formed by rotating the flat face machining cutting edges in the circumferential directions.

In his case, it becomes easier to stably apply prescribed surface roughness to the machined surface of the work material. In a case in which the recessed groove machining cutting edge is arranged within a range of the length of rotation locus, which are formed by causing the flat face machining cutting edges to rotate in the circumferential direction, in the radial direction, in particular, it becomes easier to precisely manage the projection amount of the recessed groove machining cutting edge from the flat face machining cutting edges toward the front end side in the axial direction. In addition, since the recessed groove machining cutting edge substantially simultaneously cuts (cuts the flat face at substantially the same feeding positions) the flat face on which the flat face machining cutting edges have performed the milling, it becomes easier to form the machined surface with the surface roughness within the prescribed range in the work material.

In addition, it is preferable in the aforementioned milling cutter that an angle formed between the first inclined portion and the second inclined portion is an obtuse angle or a right angle.

In addition, it is preferable in the aforementioned cutting insert that an angle formed between the first inclined portion and the second inclined portion is an obtuse angle or a right angle.

In this case, an angle (point angle) formed between the first inclined portion and the second inclined portion of the recessed groove machining cutting edge is an obtuse angle or a right angle rather than an acute angle. Therefore, edge tip strength of the recessed groove machining cutting edge is secured while the recessed groove machining cutting edge reliably forms the recessed grooves in the work material. Therefore, a fracturing suppression effect of the recessed groove machining cutting edge is obtained, and it is possible to stably perform the milling on work materials for recessed grooves over a long period of time.

Also, it is possible to secure a wide groove width of the recessed grooves formed in the machined surface of the work material and to thereby enhance visibility of the recessed grooves after the milling. Further, it is possible to make it easier for the sealing agent to be retained in the vicinity of the surface of the machined surface, for example, (the vicinity of openings rather than bottom portion of the recessed grooves) in accordance with the wide groove width of the recessed grooves and to thereby improvement in the sealing effect can be expected.

In addition, it is preferable in the aforementioned milling cutter that a plurality of insert attachment seats are formed at the outer peripheral part of the front end of the tool body with intervals provided between one another in the circumferential directions, and the cutting inserts that have the cutting edges are detachably attached to the plurality of insert attachment seats.

In this case, the milling cutter is an indexable milling cutter. Therefore, it is possible to obtain new cutting edges by replacing the cutting inserts in a case in which the cutting edges are worn away or damaged, for example. That is, it is possible to stabilize cutting efficiency by maintaining high sharpness of the cutting edges and to simply and reasonably address replacement of the cutting edges.

Specifically, although cutting edge portions (sliding sides), which slide along the work material, of the cutting inserts that have the recessed groove machining cutting edges are long, and the amount of abrasion increases in accordance with the long cutting edge portions, for example, it is possible to easily address this by replacing the cutting inserts.

In addition, it is preferable in the aforementioned milling method that surface roughness of the work material is set within a predetermined range by forming the flat face and the recessed groove in the work material.

In this case, it is possible to reliably enhance the holding property and the sealing effect of the sealing agent to a prescribed performance at the machined surface on which the milling has been performed since the surface roughness of the work material is set within a predetermined range by forming the flat face and the recessed groove in the work material.

In addition, it is preferable that the aforementioned milling method further including the steps of: forming arc-shaped recessed grooves, which protrude toward a front side in a moving direction of the tool body in the radial direction, on the work material by the recessed groove machining cutting edge that is positioned further on a front side than the axis of the tool body along the moving direction; forming arc-shaped recessed grooves, which protrude toward a rear side in the moving direction, on the work material by the recessed groove machining cutting edge that is positioned further on a rear side than the axis along the moving direction; and forming mesh grooves on the work material by intersecting the arc-shaped recessed grooves protruding toward the front side in the moving direction and the arc-shaped recessed grooves protruding toward the rear side in the moving direction.

In this case, the mesh grooves (crosshatched grooves) in which the recessed grooves are intersected to each other are formed on the machined surface of the work material after the milling. Therefore, it is possible to make it easy to visually recognize the recessed grooves in the machined surface of the work material regardless of an angle and the like at which the recessed grooves are viewed.

In addition, an effect of the formation of the recessed grooves in the machined surface of the work material becomes stable. Specifically, the recessed grooves formed in the machined surface of the work material communicate with each other. Therefore, even if deflection of an amount of held sealing agent occurs at respective parts in the machined surface at a timing at which the sealing agent is supplied to the recessed grooves in a case in which the sealing agent is held by the recessed grooves, such deflection is naturally solved through the recessed grooves that communicate with each other. That is, since it is possible to uniformly hold the sealing agent over the entire machined surface, the sealing effect is stabilized. In addition, since the intervals between the arranged recessed grooves become small in the machined surface of the work material, it is possible to significantly reduce variation in surface roughness of the machined surface.

In addition, it is preferable in the aforementioned milling method that the recessed groove machining cutting edge has a first inclined portion that extends toward the front end side in the axial direction toward an outside in a radial direction that perpendicularly intersects the axis, a second inclined portion that is arranged outside the first inclined portion in the radial direction and extends toward a base end side in the axial direction toward the outside in the radial direction, and a tip portion that is configured to connects the first inclined portion and the second inclined portion, an angle formed between the first inclined portion and the second inclined portion is an obtuse angle or a right angle, and a size of the angle is set in accordance with a surface roughness to be applied to the work material.

In this case, the angle (point angle) between the first inclined portion and the second inclined portion of the recessed groove machining cutting edge is an obtuse angle or a right angle rather than an acute angle. Therefore, the edge tip strength of the recessed groove machining cutting edge is secured while the recessed grooves are reliably formed in the work material by the recessed groove machining cutting edge. Therefore, the fracturing suppression effect of the recessed groove machining cutting edge is obtained, and it is possible to stably perform the milling on the work material for the recessed grooves over a long period of time.

In addition, it is possible to secure a wide groove width of the recessed grooves formed in the machined surface of the work material and to thereby enhance visibility of the recessed grooves after the milling. Further, it is possible to make it easier for the sealing agent to be retained in the vicinity of the surface of the machined surface, for example, (the vicinity of openings rather than bottom portion of the recessed grooves) in accordance with the wide groove width of the recessed grooves and improvement in the sealing effect can be expected.

Further, according to the aforementioned milling method, the following effects and advantages are achieved since the size of the angle (point angle) at the recessed groove machining cutting edge is set (appropriately selected) in accordance with the surface roughness (target surface roughness) to be applied to the work material.

For example, it is assumed that the surface roughness to be applied to the work material is assumed to be within a range of 5 to 20 µm, 20 to 40 µm, or 40 to 60 µm. In this case, the size of the point angle of the recessed groove machining cutting edge is set to 170° (large point angle), for example, when the recessed grooves are formed in the machined surface of the work material such that small surface roughness within the range of 5 to 20 µm is achieved. Also, the size of the point angle of the recessed groove machining cutting edge is set to 160° (a point angle with an intermediate size), for example, when the recessed grooves are formed such that intermediate surface roughness within the range of 20 to 40 µm is achieved. Also, the size of the point angle of the recessed groove machining cutting edge is set to 150° (small point angle), for example, when the recessed grooves are formed such that large surface roughness within the range of 40 to 60 µm is achieved. That is, it is possible to stabilize the groove width (the width of the opening portions of the recessed grooves) of the recessed grooves and the number of grooves formed in the machined surface of the work material and to allow the recessed grooves to be seen easily by reducing the size of the point angle of the recessed groove machining cutting edge as the surface roughness to be applied to the work material increases (the depth of the recessed grooves becomes deeper).

In addition, it is preferable that the aforementioned method further including: when the milling is performed on the work material, for which a width of a face to be machined is smaller than a diameter of a rotation locus formed by rotating the recessed groove machining cutting edge in the circumferential direction, making transition to facing after arranging the tool body to face the face to be machined in the axial direction, moving the tool body closer to the work material in the axial direction while the tool body is moved in the radial direction, and performing milling; and moving the tool body away from the work material in the axial direction while the tool body is moved in the radial direction, at a position that overlaps a position where the transition to the facing is made after completing the facing on the entire face to be machined.

As described above, it is difficult for tracks (a so-called cutter mark) due to entrance and exit of the tool, which is unintentionally formed in the related art when working is started and ended, to be formed in the machined surface of the work material on which the milling is performed. Therefore, according to the aforementioned milling method, it is possible to prevent a cutter mark from being formed in the machined surface of the work material, and the recessed grooves are uniformly formed over the entire machined surface. Therefore, the aforementioned effects and advantages of the present invention are stably achieved over the entire machined surface.

In addition, it is preferable in the aforementioned milling method that an amount of displacement in the axial direction per unit length along the moving direction in the radial direction in the milling by moving tool body closer to the work material in the axial direction while the tool body is moved in the radial direction is smaller than an amount of displacement in the axial direction per unit length along the moving direction in the radial direction in moving the tool body away from the work material in the axial direction while the tool body is moved in the radial direction after finishing facing entirely.

In this case, an inclination of inclination movement when the work material is cut into by the tool body (the amount of displacement in the axial direction per unit length in the moving direction) is smaller than an inclination of inclination movement when the tool body is taken out therefrom. Therefore, it is possible to effectively suppress the cutter mark that tends to be created when the facing is started, in particular.

Advantageous Effects of Invention

According to the milling cutter, the cutting insert, and the milling method of the present invention, it is possible to precisely apply surface roughness in a prescribed range to a work material simply using a milling without complicating manufacturing.

BRIEF DESCRIPTION OF DRAWINGS

FIG. 9A is a sectional view for describing a flat face and recessed grooves formed in the machined surface of the work material.

FIG. 9B is a sectional view for describing a flat face and recessed grooves formed in the machined surface of the work material.

FIG. 11 is a plan view illustrating a modification example of the cutting insert (an insert for machining recessed grooves).

DESCRIPTION OF EMBODIMENTS

Hereinafter, an indexable milling cutter 1 and cutting inserts 20 and 30 for a milling used in the indexable milling cutter 1 according to an embodiment of the present invention will be described with reference to drawings.

Outline Configuration of Indexable Milling Cutter

Figure 1:
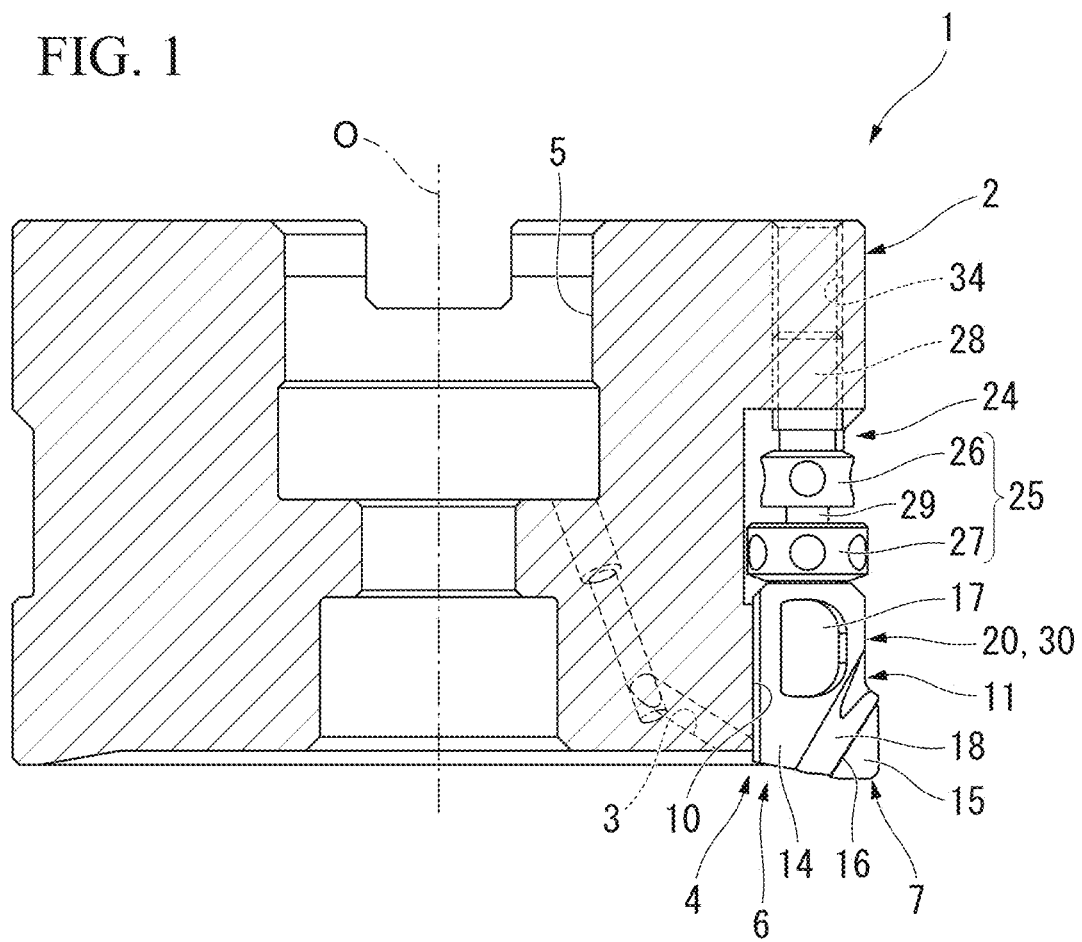
FIG. 1 is a vertical sectional view illustrating an indexable milling cutter according to an embodiment of the present invention.
Figure 2:
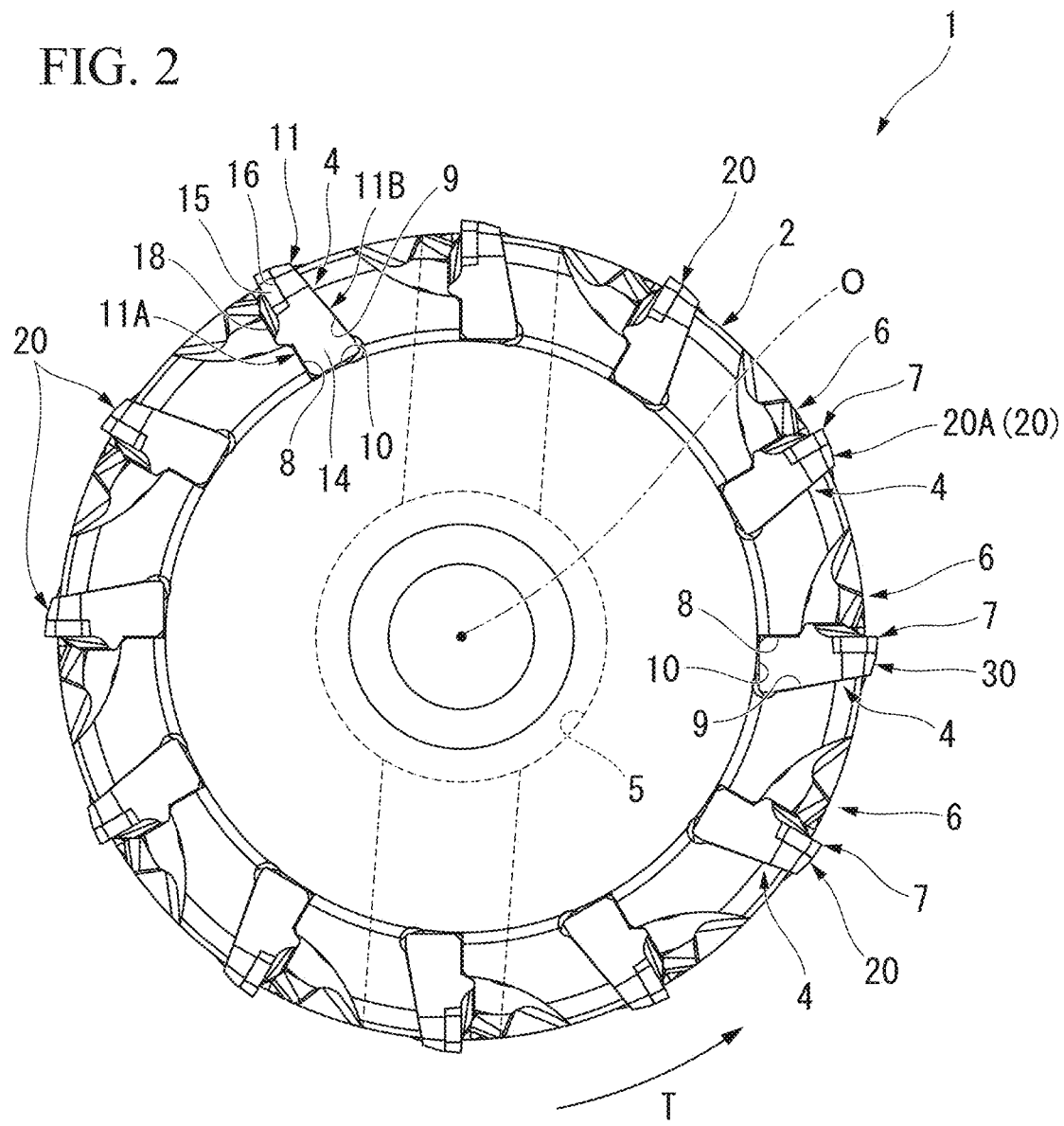
FIG. 2 is a front view of the indexable milling cutter when viewed from tip of a tool axial direction to a base end side.
Figure 3:
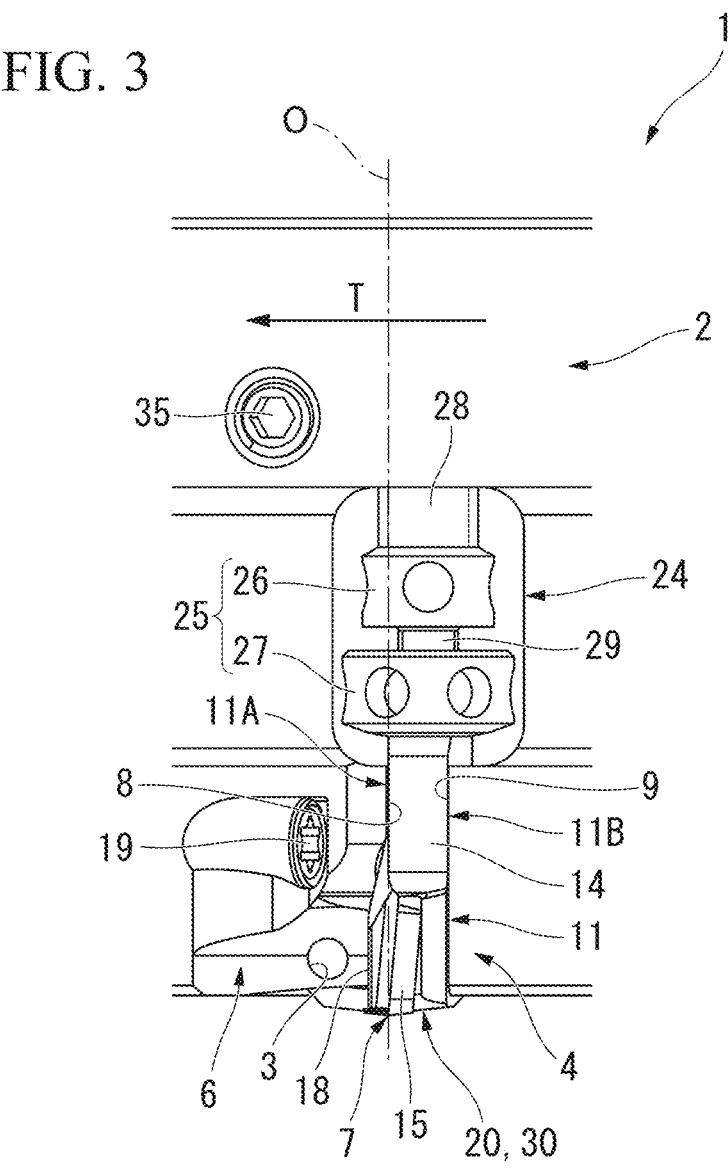
FIG. 3 is a side view illustrating a part of an outer circumference of the indexable milling cutter in an enlarged manner.
Figure 8A:
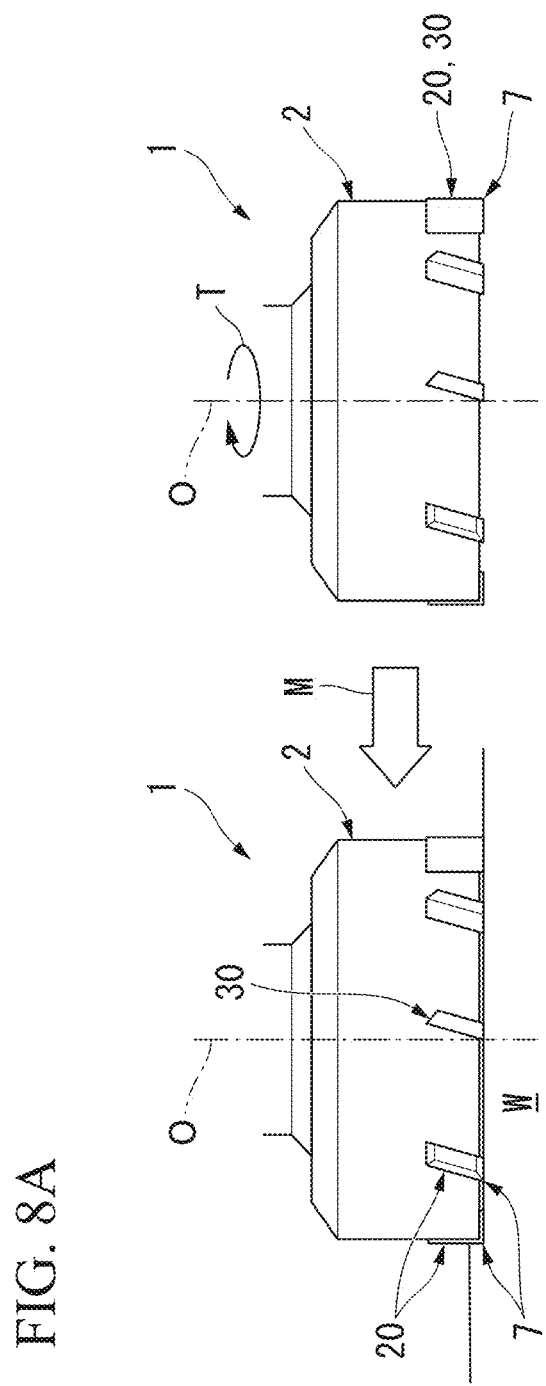
FIG. 8A is a side view for describing milling (face milling) using the indexable milling cutter.

As illustrated in FIGS. 1 to 3, the indexable milling cutter 1 according to the embodiment is a cutting tool (milling tool) that performs a milling on a work material made of a metal material such as aluminum alloy, for example. Specifically, the indexable milling cutter 1 is a milling cutter that mainly performs facing on the work material. The aforementioned facing is milling for forming a machined surface, which is perpendicular to an axis O of a tool body 2, in a work material W as illustrated in FIG. 8A.

The indexable milling cutter 1 according to the embodiment includes a tool body 2 that is formed by a steel material or the like and cutting inserts 20 and 30 that are formed by a hard material such as cemented carbide or ultra-high pressure sintered material. In the indexable milling cutter 1, the cutting inserts 20 and 30 that have cutting edges 7 are detachably attached to insert attachment seats 4 with recessed shapes formed at an outer peripheral part of a front end of the tool body 2 that is configured to rotate about the axis O.

In FIGS. 1 and 2, the cutting inserts 20 and 30 attached to the insert attachment seats 4 of the tool body 2 are arranged such that cutting edges 7 thereof project on the front end side of the tool body 2 and toward the outside in the radial direction. In the indexable milling cutter 1 according to the embodiment, multiple insert attachment seats 4 are formed at 12 locations, for example, in the tool body 2 at intervals in the circumferential direction. The indexable milling cutter 1 is a multiple-edge milling cutter in which multiple cutting inserts 20 and 30 are provided in accordance with the number of multiple insert attachment seats 4 formed at the tool body 2.

In the indexable milling cutter 1, a base end portion (upper end portion) of the tool body 2 is attached to a main axis or the like (not illustrated) of a machine tool. In the indexable milling cutter 1, the tool body 2 is configured to rotate about the axial O in the tool rotational direction T by the main axis or the like, feeding in a direction that intersects the axis O is given, and milling (milling work) is performed on the work material such as a metal material by the cutting edges 7 of the cutting inserts 20 and 30 disposed at the outer peripheral part of the tip (lower end outer circumferential portion) of the tool body 2. Specifically, the indexable milling cutter 1 mainly performs the facing (perpendicular surface milling work) on the work material by feeding in the direction that perpendicularly intersects the axis O being given while being configured to rotate in the tool rotational direction T.

Also, according to the indexable milling cutter 1, it is possible to precisely apply surface roughness in a prescribed range (predetermined range) to the machined surface (the face on which the milling has been performed) of the work material with a special configuration, which will be described below.

Definition of Orientation (Direction) Used in Embodiment

In the embodiment, in FIGS. 1 to 3, the direction along the axis O of the tool body 2 (the direction in which the axis O extends) will be referred to as an axis O direction. In addition, the direction from an attachment portion (base end portion) of the tool body 2 that is attached to the main axis or the like of the machine tool toward the insert attachment seat 4 will be referred to as a front end side (the lower side in FIGS. 1 and 3) while the direction from the insert attachment seat 4 toward the attachment portion will be referred to as a base end side (the upper side in FIGS. 1 and 3) in the axis O direction.

Also, the direction that perpendicularly intersects the axis O will be referred to as a radial direction. In the radial direction, the orientation that approaches the axis O will be referred to as an inside in the radial direction while the orientation away from the axis O will be referred to as an outside in the radial direction.

Also, the direction going around the axis O will be referred to as a circumferential direction. In the circumferential direction, the orientation in which the tool body 2 is configured to rotate by the main axis or the like of the machine tool for cutting will be referred to as a tool rotational direction T while the rotational direction opposite thereto will be referred to as a side opposite to the tool rotational direction T (reverse tool rotational direction).

Tool Body

In FIGS. 1 to 3, the tool body 2 has a columnar or disk shape and is configured to rotate about a center axis (axis O) thereof by the main axis or the like of the machine tool. In the example of this embodiment, the tool body 2 has a columnar shape as illustrated in FIG. 1.

In addition, an attachment hole 5 that penetrates through the tool body 2 in the axis O direction is formed in the tool body 2. By inserting a bolt member, which is not illustrated, into the attachment hole 5 from the opening of the attachment hole 5 on the front end side and screwing the bolt member onto the main axis or the like of the machine tool, movement of the tool body 2 relative to the main axis or the like is restricted, and the tool body 2 is secured to the main axis or the like.

A plurality of chip pockets 6 that are recessed into concave shapes from the outer peripheral part of the tip are formed at the outer peripheral part of the front end of the tool body 2 with intervals provided between one another in the circumferential direction.

The insert attachment seats 4 to which the cutting inserts 20 and 30 are detachably attached are respectively provided at portions positioned on the opposite side of these chip pockets 6 in the tool rotational direction T. The insert attachment seats 4 have a rectangular hole shape or a groove shape corresponding to the shapes of the cutting inserts 20 and 30.

In addition, an adjustment mechanism 25 capable of adjusting the positions of the cutting edges 7 of the cutting inserts 20 and 30, which are attached to the insert attachment seats 4, in the axis O direction are provided in the tool body 2.

Configurations of the insert attachment seats 4 and the adjustment mechanism 25 will be separately described in detail after describing configurations of the cutting inserts 20 and 30.

Note that the part represented by the reference numeral 35 in FIG. 3 is a balance screw for adjusting a rotation balance of the indexable milling cutter 1. A plurality of balance screws 35 are provided in an outer circumferential surface of the tool body 2 with intervals provided between one another in the circumferential direction.

In FIGS. 1 and 3, coolant holes 3 that eject a coolant (an oil-based or water-soluble cutting agent) are opened in the chip pockets 6 toward the vicinities of the cutting edges 7 of the cutting inserts 20 and 30 attached to the insert attachment seats 4. The base end portions of the coolant holes 3 are connected to coolant supply means, which is not illustrated, through the main axis or the like of the machine tool attached to the base end portion of the tool body 2, and tip portions of the coolant holes 3 are opened to the chip pockets 6.

Cutting Insert

In the embodiment, either the cutting insert 20 (an insert for working a flat face) and the cutting insert 30 (an insert for machining recessed grooves) that are for a milling and have mutually different shapes of cutting edge 7 are attached to the plurality of insert attachment seats 4 formed at the outer peripheral part of the front end of the tool body 2 with intervals provided between one another in the circumferential direction. The cutting inserts 20 and 30 are inserts for front milling that is used for a front milling (facing), in particular, among millings. Configurations of these cutting inserts 20 and 30 other than the mutual shapes of the cutting edges 7 are substantially common to each other.

The cutting insert 30 for working the recessed grooves among the cutting inserts 20 and 30 are detachably attached to at least one or more insert attachment seats 4 among the plurality of insert attachment seats 4 of the tool body 2. In the embodiment, the cutting insert 30 for working the recessed grooves is provided only at one insert attachment seat 4, and the cutting inserts 20 for working the flat face are respectively provided in the rest of the plurality of insert attachment seats 4, among the insert attachment seats 4 of the tool body 2.

Figure 4:
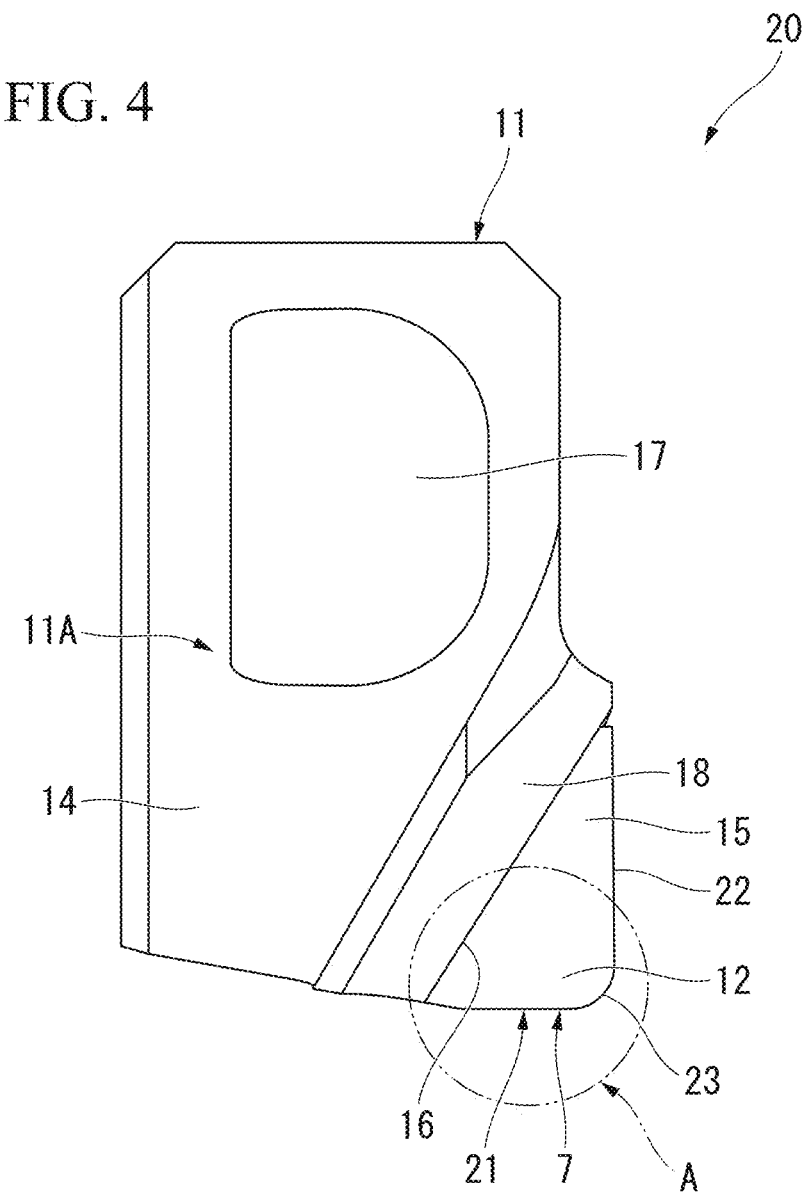
FIG. 4 is a plan view illustrating a cutting insert (an insert for working a flat face) provided with a flat face machining cutting edge among a plurality of cutting inserts attached to the indexable milling cutter.
Figure 5:
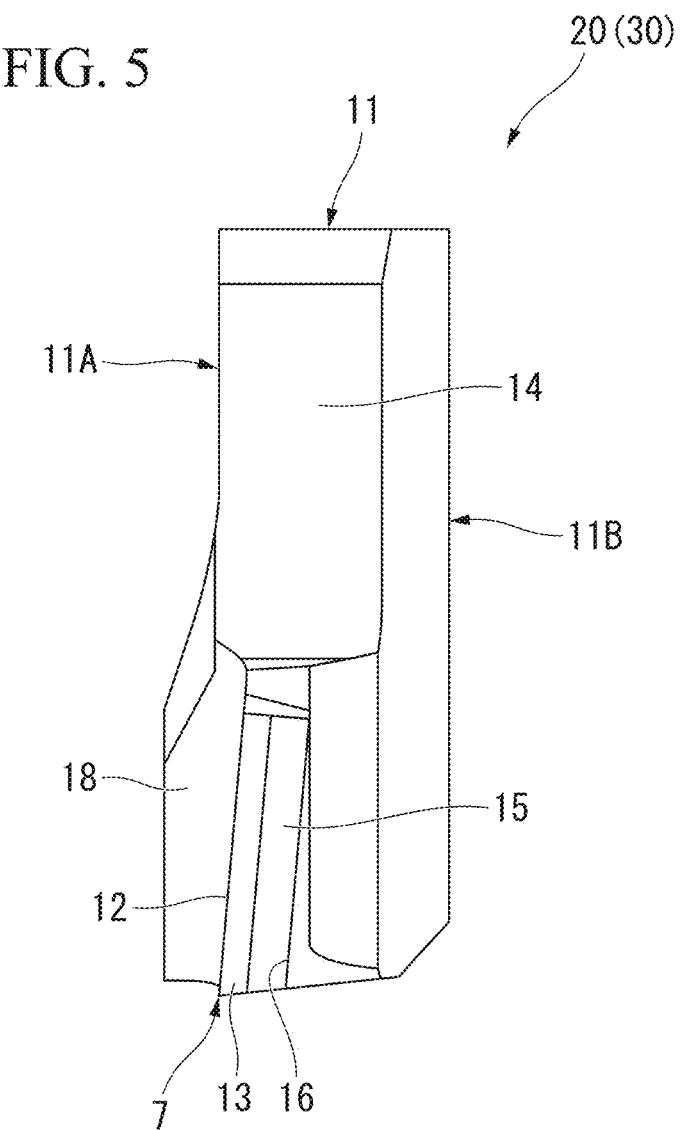
FIG. 5 is a side view of the cutting insert.
Figure 6:
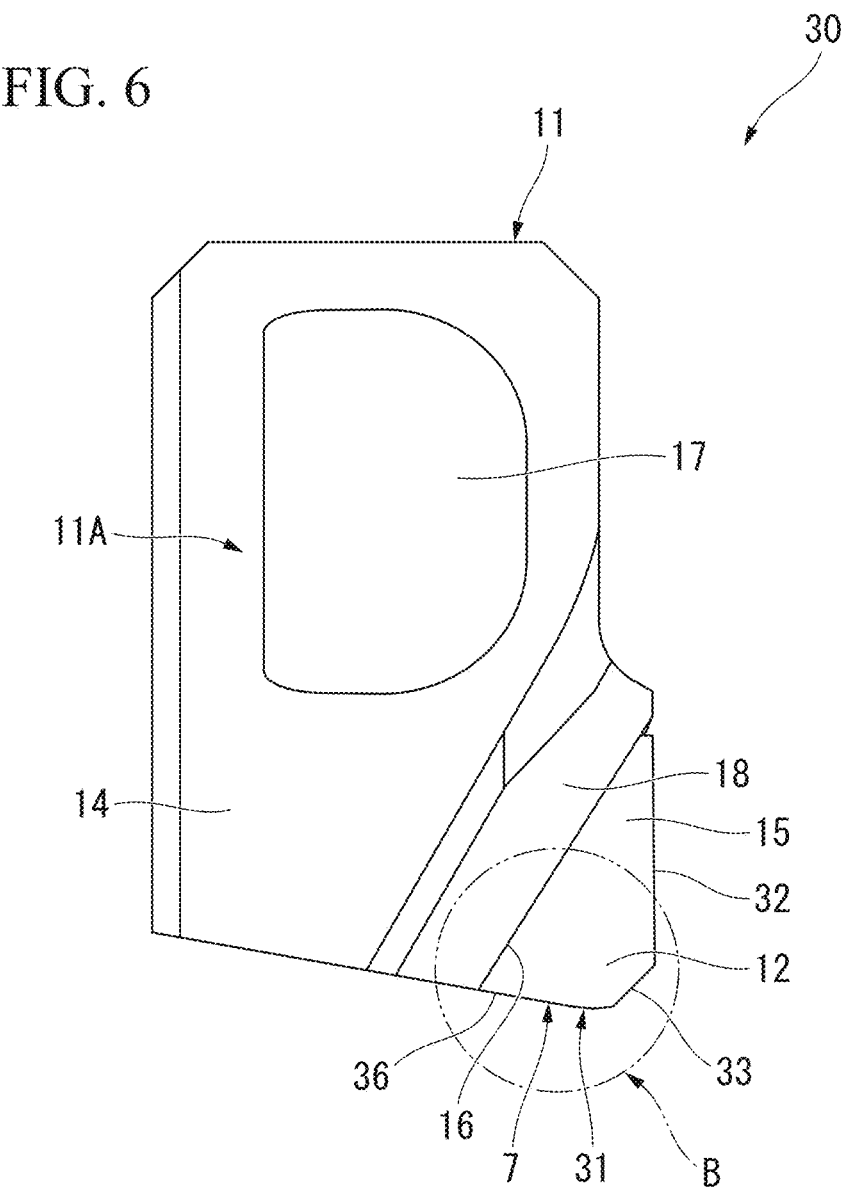
FIG. 6 is a plan view illustrating a cutting insert (an insert for working a recessed groove working) provided with a recessed groove machining cutting edge among a plurality of cutting inserts attached to the indexable milling cutter.

As illustrated in FIGS. 4 to 6, the cutting inserts 20 and 30 include insert bodies 11 that are attached to the insert attachment seats 4 of the tool body 2 and cutting edges 7 that are formed on an intersecting ridge line of rake faces 12 and flank faces 13 of the insert bodies 11 and are arranged on the forefront front end side of the insert bodies 11.

As illustrated in FIG. 2, the respective cutting edges 7 of the plurality of cutting inserts 20 and 30 are arranged at the outer peripheral part of the front end of the tool body 2 with intervals provided between one another in the circumferential direction. The plurality of cutting edges 7 provided in the indexable milling cutter 1 according to the embodiment includes flat face machining cutting edges 21 that extends along a virtual plane that is perpendicular to the axis O (cutting edges 7 of the cutting inserts 20 for working the flat face illustrated in FIG. 4) and recessed groove machining cutting edge 31 that projects further toward the front end side than the flat face machining cutting edge 21 (the cutting edge 7 of the cutting insert 30 for working the recessed grooves as illustrated in FIG. 6).

Insert Body

In FIGS. 4 to 6, the insert bodies 11 of the cutting inserts 20 and 30 have polygonal plate shapes. Specifically, the insert bodies 11 have rectangular plate shapes in the embodiment. The cutting inserts 20 and 30 are arranged such that the longitudinal direction (a direction in which the rectangular faces extend; the upper-lower direction in FIGS. 4 and 6) of the rectangular faces (the front faces and the rear faces) of the insert bodies 11 conforms to the axis O direction of the tool body 2 when the cutting inserts 20 and 30 are attached to the insert attachment seats 4. Also, the cutting inserts 20 and 30 are arranged such that the lateral side direction (the width direction of the rectangular faces; the left-right direction in FIGS. 4 and 6) of the rectangular faces of the insert bodies 11 conforms to the radial direction of the tool body 2. In addition, the cutting inserts 20 and 30 are arranged such that the thickness direction (the direction that perpendicularly intersects the rectangular faces; the left-right direction in FIG. 5) of the insert bodies 11 conforms to the circumferential direction of the tool body 2.

Each insert body 11 includes a base metal portion 14 that has a rectangular plate shape and a cutting edge portion 15 with a triangular plate shape which is bonded to a corner portion of the base metal portion 14 and at which the cutting edge 7 is formed.

The base metal portion 14 is formed by a hard sintered alloy such as cemented carbide. The cutting edge portion 15 is formed by an ultra-high pressure sintered material that is harder than the base metal portion 14, such as a diamond sintered body or a cBN sintered body. Note that entire insert body 11 including the base metal portion 14 and the cutting edge portion 15 may be integrally formed by a hard sintered alloy such as cemented carbide.

In the embodiment, the cutting edge portion 15 is arranged at one corner portion of a first polygonal face 11A that serves as a front face among a pair of polygonal faces (rectangular faces) 11A and 11B that form the front face and the rear face of each insert body 11 (the corner portion positioned at the outer peripheral part of the tip of the indexable milling cutter 1 when the cutting inserts 20 and 30 are attached to the insert attachment seats 4) and is bonded to the base metal portion 14.

A recessed portion 16 with a right-angled triangular hole shape that is recessed in the thickness direction of the insert body 11 from the polygonal face 11A is formed at the aforementioned corner portion of the first polygonal face 11A in the base metal portion 14. The cutting edge portion 15 is bonded to the recessed portion 16 by brazing or the like or integrally sintering the cutting edge portion 15 with the base metal portion 14.

In addition, a clamping recessed location 17 that is recessed in the thickness direction from the polygonal face 11A is formed in the first polygonal face 11A of the base metal portion 14. In the example of the embodiment, the clamping recessed location 17 has a D shape in insert plan views illustrated in FIGS. 4 and 6. The depth (the length in the thickness direction) of the clamping recessed location 17 is set to be shallower toward an end portion on the side opposite to the cutting edge portion 15 from the cutting edge portion 15 along the short side direction of the insert body 11. That is, the bottom face of the clamping recessed location 17 is an inclined face.

In addition, a chip processing rib 18 that projects in the thickness direction from the polygonal face 11A and extends on the polygonal face 11A is formed at a portion positioned between the clamping recessed location 17 and the cutting edge portion 15 in the first polygonal face 11A. The chip processing rib 18 is formed to extend in a straight line shape along oblique sides of the cutting edge portion 15 and the recessed portion 16 that form a substantially right-angled triangular shape in the insert plan views illustrated in FIGS. 4 and 6.

The chip processing rib 18 is formed to surround the cutting edge portion 15 positioned at the corner portion of the insert body 11 in the longitudinal direction and the lateral direction of the insert body 11. Therefore, the chip processing rib 18 is arranged to surround the cutting edge portion 15 from the base end side toward the front end side in the axis O direction of the tool body 2 and from the inside to the outside in the radial direction as illustrated in FIG. 1 when the cutting inserts 20 and 30 are attached to the insert attachment seats 4.

As illustrated in FIG. 2, the thickness (the length in the thickness direction) of the base metal portion 14 of the insert body 11 is the distance between the first polygonal face 11A that serves as the front face of the insert body 11 and the second polygonal face 11B that serves as the rear face. The thickness of the base metal portion 14 is set to be thicker toward the end portion on the side opposite to the cutting edge portion 15 (toward the inside in the radial direction of the tool body 2) from the cutting edge portion 15 in the lateral direction of the insert body 11 (corresponding to the radial direction of the tool body 2 in FIG. 2).

In FIGS. 4 to 6, the cutting edge portion 15 has a substantially right-angled triangular plate shape with a specific thickness. The triangular face that serves as the rear surface in the pair of triangular faces, which are orientated in the thickness direction, of the cutting edge portion 15 is bonded to the recessed portion 16, and the triangular face that serves as the front face is exposed to the outside at the corner portion of the first polygonal face 11A of the insert body 11 to be the rake face 12.

In addition, three side faces that have substantially rectangular face shapes are formed at an outer circumferential face of the cutting edge portion 15 directed in a direction that is perpendicular to the thickness direction. Among these side faces, a side face positioned at the oblique side of the cutting edge portion 15 with the right-angled triangular plate shape is bonded to the recessed portion 16. Also, the side face that faces the front end side of the tool body 2 and the side face that faces the outside of the tool body 2 in the radial direction serves as flank faces 13 when the insert body 11 is attached to the insert attachment seat 4, among the three side faces.

The cutting edges 7 of the cutting inserts 20 and 30 are formed on the intersecting ridge line of the rake faces 12 and the flank faces 13 of the cutting edge portions 15. In the embodiment, an axial direction rake angle (axial rake angle) of the rake faces 12 of the cutting edges 7 is a positive angle when the cutting inserts 20 and 30 are attached to the insert attachment seats 4. Also, a clearance angle is applied to the flank faces 13 of the cutting edges 7.

The cutting edge (the cutting edge that extends in the lateral direction) that extends along a shorter side of the first polygonal face (rectangular face) 11A of the insert bodies 11 among the cutting edges 7 serves as a front edge that projects from the insert attachment seats 4 to the front end side of the tool body 2 when the cutting inserts 20 and 30 are attached to the insert attachment seats 4. In addition, the cutting edge (the cutting edge that extends in the longitudinal direction) that extends along a longer side of the first polygonal face 11A among the cutting edges 7 serves as an outer circumferential edge that projects from the insert attachment seats 4 to the outside of the tool body 2 in the radial direction when the cutting inserts 20 and 30 are attached to the insert attachment seats 4.

Cutting Edge of Cutting Insert for Machining Flat Face

The cutting edge 7 of the cutting insert 20 for working the flat face will be described.

Figure 7A:
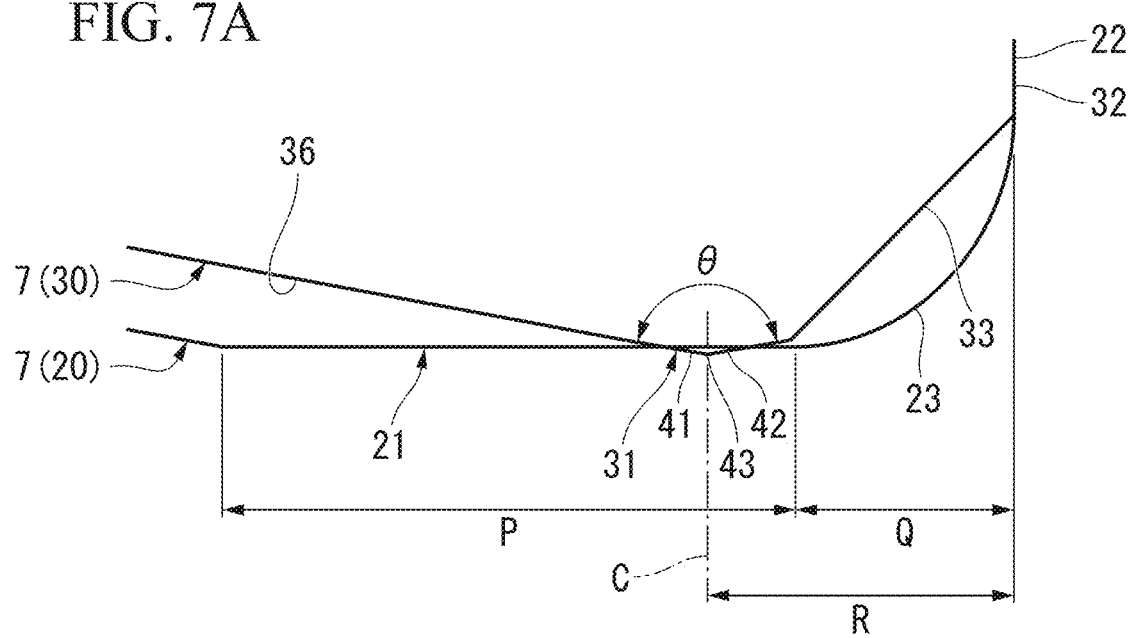
FIG. 7A is a diagram illustrating an A part (flat face machining cutting edge) in FIG. 4 and a B part (recessed groove machining cutting edge) in FIG. 6 in an enlarged manner and a diagram for describing a positional relationship between rotation locus of the cutting edges.

As illustrated in FIGS. 4 and 7A, the cutting edge 7 of the cutting insert 20 has a front edge 21, an outer circumferential edge 22, and a corner edge 23 that connects the front edge 21 and the outer circumferential edge 22. The front edge 21 of the cutting insert 20 serves as the flat face machining cutting edge 21 that extends in a straight line shape in the lateral direction of the insert body 11. The outer circumferential edge 22 extends in a straight line shape in the longitudinal direction of the insert body 11. The corner edge 23 has a convex curved shape. The corner edge 23 is connected to an end edge outside the insert in the lateral direction of the front edge 21 (an outer edge in the radial direction) and an end edge outside the insert in the longitudinal direction of the outer circumferential edge 22 (tip edge) such that the corner edge 23 is in contact with the end edges.

In addition, the a portion that is adjacent to the flat face machining cutting edge 21 on a side opposite to the outer circumferential edge 22 of the cutting edge 7 in the lateral direction of the insert body 11 extends such that the portion is inclined toward the inside of the insert in the longitudinal direction of the insert body 11 (gradually retracts toward the inside of the insert in the longitudinal direction) from the connection portion with the flat face machining cutting edge 21 toward the aforementioned opposite side.

The flat face machining cutting edge 21 is arranged to extend along the virtual plane that is perpendicular to the axis O of the tool body 2 when the cutting insert 20 is attached to the insert attachment seat 4. That is, the flat face machining cutting edge 21 extends to be positioned on the virtual plane. Note that since the flat face machining cutting edge 21 may have any shape as long as the flat face machining cutting edge 21 extends along the virtual plane that is perpendicular to the axis O, the shape is not limited to the aforementioned straight line shape and may be a convex curved shape with a large curvature radius, for example.

In FIG. 7A, a length P (that is, the edge length of the flat face machining cutting edge 21) of the flat face machining cutting edge 21 in the lateral direction of the insert body 11 is equal to or less than 2 mm, for example. In addition, a length Q of the corner edge 23 in the lateral direction of the insert body 11 corresponds to the size of the curvature radius of the corner edge 23 and is 0.4 to 0.8 mm, for example.

In the embodiment, the plurality of flat face machining cutting edges 21 are provided in the tool body 2 with intervals provided between one another in the circumferential direction since the plurality of cutting inserts 20 are attached to the plurality of insert attachment seats 4 of the tool body 2. The positions of these flat face machining cutting edges 21 in the axis O direction are substantially the same as one another, and the flat face machining cutting edge 21 at the forefront end that is arranged on the forefront front end side in the axial O direction is decided in advance (selected in advance). In addition, the flat face machining cutting edge 21 at the forefront end serves as a flat drag that performs final finishing working on the flat face that is formed on the machined surface of the work material. In FIG. 2, the reference numeral 20A is applied to the cutting insert 20 that has the flat face machining cutting edge 21 at the forefront end in order to distinguish the cutting insert 20 from the other cutting inserts 20.

Although not particularly illustrated in the drawings, the distance from the flat face machining cutting edge 21 at the forefront end to the flat face machining cutting edge 21 at the most proximal end, which is arranged on the most base end side in the axis O direction, among the plurality of flat face machining cutting edges 21 (that is, precision of front deflection) is preferably equal to or less than 5 µm, for example, in terms of a management value.

Cutting Edge of Cutting Insert for Machining Recessed Grooves

The cutting edge 7 of the cutting insert 30 for working the recessed grooves will be described.

As illustrated in FIGS. 6 and 7A, the cutting edge 7 of the cutting insert 30 has a front edge 31, an outer circumferential edge 32, and a corner edge 33 that connects the front edge 31 and the outer circumferential edge 32. The front edge 31 of the cutting insert 30 serves as the recessed groove machining cutting edge 31 with a convex V shape that projects toward the outside of the insert in the longitudinal direction of the insert body 11. The recessed grooves are formed in the machined surface of the work material by the recessed groove machining cutting edge 31 with the convex V shape performing the milling on the work material. The outer circumferential edge 32 extends in a straight line shape in the longitudinal direction of the insert body 11. The corner edge 33 has a straight line shape that is inclined relative to the longitudinal direction and the lateral direction. The corner edge 33 has a chamfered shape and is connected to the end edge (the outer edge in the radial direction) outside the insert in the lateral direction of the front edge 31 and the end edge (tip edge) outside the insert in the longitudinal direction of the outer circumferential edge 32 such that the corner edge 33 respectively intersects the end edges at obtuse angles.

In addition, a portion (inner edge 36) that is adjacent to the recessed groove machining cutting edge 31 on the side opposite to the outer circumferential edge 32 in the lateral direction of the insert body 11 among the cutting edges 7 extends such that the portion is inclined toward the inside of the insert in the longitudinal direction of the insert body 11 (gradually retracts toward the inside of the insert in the longitudinal direction) from the connection portion with the recessed groove machining cutting edge 31 toward the aforementioned opposite side.

Figure 7B:
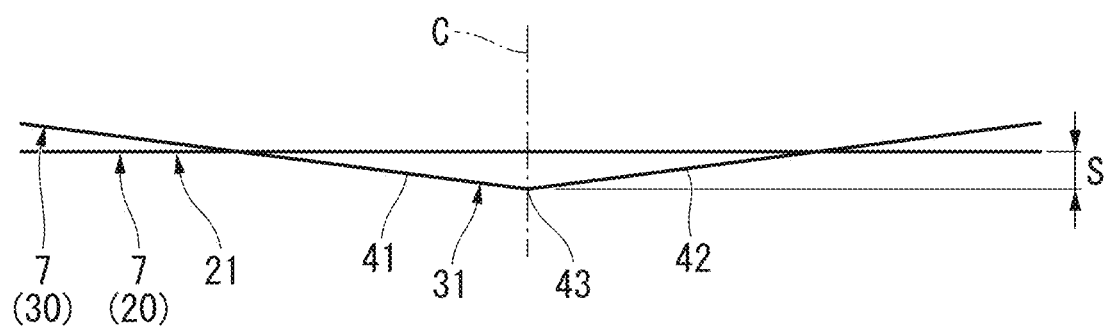
FIG. 7B is a diagram illustrating main parts in FIG. 7A in an enlarged manner.

FIGS. 7A and 7B illustrate relative positions of the cutting edge 7 of the cutting insert 20 for working the flat face and the cutting edge 7 of the cutting insert 30 for working the recessed grooves in the rotation locus around the axis O (the relative position in the axis O direction and the radial direction).

The recessed groove machining cutting edge 31 projects further toward the front end side than the flat face machining cutting edge 21 at the forefront end in the axis O direction among a plurality of flat face machining cutting edges 21 when the cutting insert 30 for working the recessed grooves is attached to the insert attachment seat 4.

Specifically, the projection amount S by which the recessed groove machining cutting edge 31 projects toward the front end side in the axis O direction relative to the flat face machining cutting edge 21 at the forefront end is set to a predetermined value in accordance with the prescribed surface roughness (target surface roughness) to be applied to the machined surface of the work material. Note that in order to obtain the projection amount S (predetermined value), the projection amount S of the recessed groove machining cutting edge 31 is set to be slightly small relative to the target surface roughness. For example, Equations 1 and 2 shown below are equations that indicate this fact.

"Projection amount (μm)=0.9248×target surface roughness $Rz$ (μm)−0.3445"     Equation 1

"Projection amount (μm)=0.9407×target surface roughness $Rz$ (μm)−0.5984"     Equation 2

In addition, it is preferable that the target surface roughness be set to a center value of the required surface roughness (within a prescribed range of surface roughness to be applied) in consideration of variations (maximum of about 8 μm).

Note that the projection amount S (predetermined value) may be obtained by a method other than Equations 1 and 2 described above.

As illustrated in FIG. 2, the cutting inserts 30 for working the recessed grooves that have the recessed groove machining cutting edges 31 are arranged to adjacent, on the opposite side, to the cutting insert 20A (the cutting insert 20 at the forefront end) for working the flat face that has the flat face machining cutting edge 21 at the forefront end in the tool rotational direction T in the embodiment (that is, immediately behind it in the tool rotation direction T). In other words, the flat face machining cutting edge 21 at the front tip is arranged to be adjacent to the recessed groove machining cutting edge 31 in the tool rotational direction T.

As illustrated in FIGS. 7A and 7B, the recessed groove machining cutting edge 31 has a first inclined portion 41 that extends toward the front end side in the axis O direction toward the outside (the right side in FIGS. 7A and 7B) of the tool body 2 in the radial direction, a second inclined portion 42 that is arranged outside the first inclined portion 41 in the radial direction and extends toward to the base end side in the axis O direction toward the outside in the radial direction, and a tip portion 43 that is configured to connect the first inclined portion 41 and the second inclined portion 42. Therefore, the recessed groove machining cutting edge 31 is formed into a convex V shape that protrudes toward the front end side (the lower side in FIGS. 7A and 7B) of the tool body 2 as a whole.

An angle θ (point angle) that is formed between the first inclined portion 41 and the second inclined portion 42 is an obtuse angle or a right angle. In the embodiment, the angle θ is an obtuse angle, and specifically, the angle θ is 170°, for example. The size of the angle θ is set in accordance with the prescribed surface roughness (target surface roughness) to be applied to the machined surface of the work material. Specifically, the prescribed surface roughness is set to be as small as 5 to 20 μm, and in accordance with this, the size of the angle θ of the recessed groove machining cutting edge 31 is set to a large obtuse angle that is close to a straight angle) (180°) in the embodiment. A relationship between the size of the prescribed surface roughness and the size of the angle θ will be separately described later.

Also, the first inclined portion 41 and the second inclined portion 42 are formed into a linearly symmetric shape with reference to the virtual straight line C that passes through the tip portion 43 and is parallel to the axis O of the tool body 2 as a symmetric axis.

As illustrated in FIGS. 7A and 7B, the recessed groove machining cutting edge 31 is arranged within a range of the length of the rotation locus, which is formed by causing the flat face machining cutting edge 21 to rotate about the axis O of the tool body 2, in the radial direction. That is, the position of the recessed groove machining cutting edge 31 in the radial direction is set within the range of the edge length P in the radial direction of the flat face machining cutting edge 21.

In the example illustrated in the drawing, the recessed groove machining cutting edge 31 is arranged to correspond to the outer portion of the rotation locus (edge length P) of the flat face machining cutting edge 21 in the radial direction. However, the recessed groove machining cutting edge 31 is not limited thereto and may be arranged to correspond to the inner portion of the rotation locus of the flat face machining cutting edge 21 in the radial direction. In addition, the recessed groove machining cutting edge 31 may be arranged to correspond to an intermediate portion (including the center portion) between the inner end portion and the outer end portion of the rotation locus of the flat face machining cutting edge 21 in the radial direction.

In FIG. 7A, a length R from the outer circumferential edge 32 to the tip portion 43 of the recessed groove machining cutting edge 31 in the lateral direction of the insert body 11 is Q≤R≤(P+Q) and is preferably R≈(P/2)+Q.

In a case in which the flat face machining cutting edge 21 is formed into a convex curved shape with a large curvature radius, for example, it is preferable that the recessed groove machining cutting edge 31 be arranged to correspond to the forefront end portion positioned on the forefront front end side of the rotation locus of the flat face machining cutting edge 21 in the axis O direction (such that the recessed groove machining cutting edge 31 is located at the same position as that of the forefront end portion in the radial direction). In this manner, the aforementioned projection amount S is precisely set to a predetermined value.

Note that the actual projection amount S is preferably within a range of ±1 μm, for example, in terms of a management value, relative to the predetermined target value calculated by Equations 1 and 2 as described above or the like.

In addition, although the recessed groove machining cutting edge 31 is arranged within the range of the length of the rotation locus, which is formed by causing the flat face machining cutting edge 21 to rotate in the circumferential direction, in the radial direction in the embodiment, the recessed groove machining cutting edge 31 is not limited thereto. For example, the recessed groove machining cutting edge 31 may be arranged inside the rotation locus of the flat face machining cutting edge 21 in the radial direction.

In addition, the first inclined portion 41 and the second inclined portion 42 respectively have straight line shapes, and the tip portion 43 is formed to a sharp corner portion that connects tip edges of these inclined portions 41 and 42 in the embodiment. However, the shapes are not limited thereto, and the first inclined portion 41 and the second inclined portion 42 may be formed in convex curved shapes, concave curved shapes, and linear shapes as a composite combination of these shapes, or the like other than the straight line shapes, for example. In addition, the tip portion 43 may be formed into a convex curved shape with a small curvature radius other than the aforementioned sharp corner portion.

Insert Attachment Seat

As illustrated in FIGS. 1 to 3, the insert attachment seat 4 opens from the tip face and an outer circumferential face of the tool body 2, extends in the axis O direction, and has a rectangular hole shape or a groove shape. The insert attachment seat 4 includes an attachment seat front wall face 8 that faces a side opposite to the tool rotational direction T, an attachment seat rear wall face 9 that faces the tool rotational direction T, and an attachment seat bottom face 10 that is positioned at an end portion (deepest portion) inside the insert attachment seat 4 in the radial direction, faces the outside in the radial direction, and connects the attachment seat front wall face 8 and the attachment seat rear wall face 9.

In the example of the embodiment, the attachment seat front wall face 8 has a planar shape that is formed to conform to the virtual plane including the axis O, and the attachment seat bottom face 10 is formed into a planar shape that substantially perpendicularly intersects the attachment seat front wall face 8. In addition, the attachment seat rear wall face 9 is formed into a planar shape that is inclined to approach the attachment seat front wall face 8 toward the outside in the radial direction from the attachment seat bottom face 10.

A screw hole, which is not illustrated, is opened at a portion that is positioned on the further tool rotational direction T than the insert attachment seat 4 in the outer circumferential face of the tool body 2. The screw hole is formed to penetrate from the outer circumferential face of the tool body 2 to the attachment seat front wall face 8 of the insert attachment seat 4. The screw hole extends to be gradually inclined from the outer circumferential face of the tool body 2 to the opposite side in the tool rotational direction T. A clamp screw 19 that is pressurizing means for pressing the insert bodies 11 of the cutting inserts 20 and 30 and securing the insert bodies 11 to the insert attachment seats 4 is screwed into the screw hole. The tip of the clamp screw 19 abuts on the inside of the clamping recessed location 17 of each of the cutting inserts 20 and 30.

Adjustment Mechanism

An adjustment mechanism accommodation recessed portion 24 that is opened in the outer circumferential face of the tool body 2 and extends in the axis O direction is formed on the base end side of each insert attachment seat 4. The base end portion of the insert attachment seat 4 communicates with the inside of the adjustment mechanism accommodation recessed portion 24. The adjustment mechanism 25 that adjusts the positions of the cutting inserts 20 and 30 relative to the insert attachment seats 4 in the axis O direction is provided in the adjustment mechanism accommodation recessed portion 24.

The adjustment mechanism 25 has an axis member 26 and a nut member 27.

Both end portions of the axis member 26 serves as screw axes 28 and 29. Disk-shaped portion positioned between a pair of screw axes 28 and 29 in the axis member 26 serves as an operation unit with a larger diameter than these screw axes 28 and 29. A locking hole at which an operation tool such as a wrench is locked is formed in an outer circumferential face of the operation unit. In addition, screw pitches of the pair of screw axes 28 and 29 differ from each other. Specifically, the pitch of the screw of the screw axis 28, which is positioned on the base end side, of the axis member 26 in the axis O direction is set to be larger than the pitch of the screw of the screw axis 29 positioned on the front end side in the axis O direction.

The screw axis 28, which is positioned on the base end side, of the axis member 26 is screwed into a screw hole 34 that is opened in a wall face that faces the front end side of the adjustment mechanism accommodation recessed portion 24 in the axis O direction. The screw axis 29, which is positioned on the front end side, of the axis member 26 is screwed into the nut member 27.

The tip face of the nut member 27 abuts on base end face of the insert body 11 of each of the cutting inserts 20 and 30. A locking hole at which an operation tool such as a wrench is locked is formed in an outer circumferential face of the nut member 27.

It is possible to adjust the positions of the cutting inserts 20 and 30 relative to the insert attachment seats 4 in the axis O direction by operating the operation tool for the axis member 26 and the nut member 27 to be rotated about the center axis of the screw.

Posture and Procedure of Attachment of Cutting Insert to Insert Attachment Seat

The cutting inserts 20 and 30 are inserted into the insert attachment seats 4 from the front end of the tool body 2 to the base end side such that the first polygonal faces 11A of each insert body 11 and the rake face 12 of the cutting edge portion 15 are directed in the tool rotational direction T and the second polygonal face 11B is directed on the side opposite to the tool rotational direction T. At this time, the cutting inserts 20 and 30 are inserted into the insert attachment seats 4 while the side face of each insert body 11 (the side face that faces the inside of in radial direction) and the attachment seat bottom face 10 are in slidable contact with each other, the first polygonal face 11A and the attachment seat front wall face 8 are in slidable contact with each other, and the second polygonal face 11B and the attachment seat rear wall face 9 are in slidable contact with each other. Movement of the cutting inserts 20 and 30, which are inserted into the insert attachment seats 4 as described above, toward the outside of the insert attachment seat 4 in the radial direction is restricted.

In addition, the depth of the insert attachment seat 4 in the radial direction from the outer circumferential face of the tool body 2 to the attachment seat bottom face 10 is set to such a size that the outer circumferential edges 22 and 32 of the cutting edge portions 15 of the cutting inserts 20 and 30 disposed at the insert attachment seats 4 project from the outer circumferential surface of the tool body 2. In addition, each insert body 11 is seated in the axis O direction at a location at which the base end face of the insert body 11 inserted into the insert attachment seat 4 abuts on the tip face of the nut member 27 of the adjustment mechanism 25. If the clamp screw 19 is fastened, then the tip face of the clamp screw 19 is substantially perpendicularly pressed against the bottom surface of the clamping recessed location 17 of the insert body 11, and the cutting inserts 20 and 30 are secured to the insert attachment seats 4.

In this state, position adjustment is performed by the adjustment mechanism 25 such that the flat face machining cutting edge 21 of the cutting edge portion 15 of each cutting insert 20 attached to the insert attachment seat 4 projects from the front end face of the tool body 2 and is positioned on one virtual plane that is perpendicular to the axis O. In addition, the position adjustment is performed by the adjustment mechanism 25 such that the projection amount S of the recessed groove machining cutting edge 31 of the cutting edge portion 15 of the cutting insert 30 in the axis O direction relative to the flat face machining cutting edge 21 at the forefront end among the plurality of flat face machining cutting edges 21 becomes a predetermined value.

Milling Method Performed by Indexable Milling Cutter

Next, a milling method of a work material using the indexable milling cutter 1 according to the embodiment will be described.

Figure 8B:
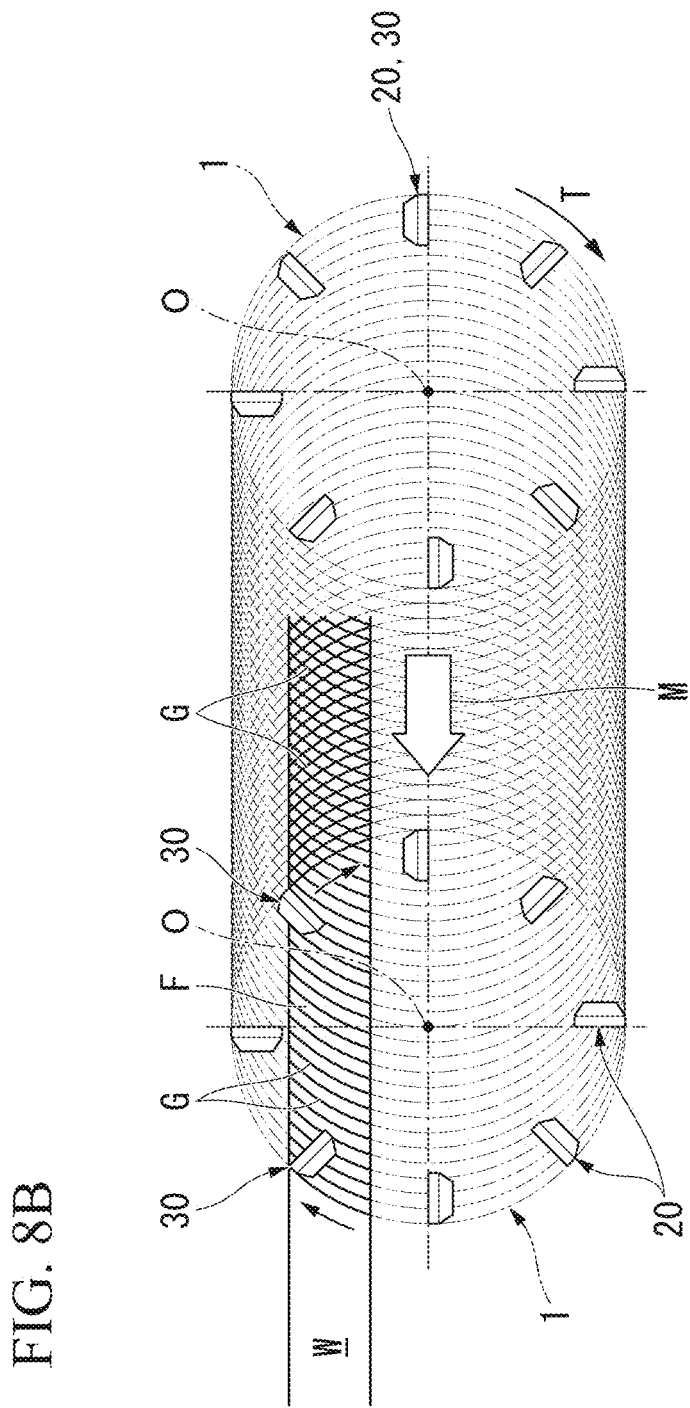
FIG. 8B is a top view for describing a technology for forming mesh grooves (crosshatched grooves) in a machined surface of the work material by milling using the indexable milling cutter.

As illustrated in FIGS. 8A and 8B, the tool body 2 is configured to rotate in the tool rotational direction T among circumferential directions relative to the work material W and is moved in the radial direction that perpendicularly intersects the axis O in order to perform the milling (facing) on the work material W by using the indexable milling cutter 1. In the example illustrated in the drawing, the tool body 2 is moved relative to the work material W in the moving direction M among radial directions to conform to the extending direction of the work material W. Note that the moving direction M of the tool body 2 in the radial direction may be slightly inclined relative to the extending direction of the work material W in a top view illustrated in FIG. 8B.

As illustrated in FIGS. 7A to 9B, the indexable milling cutter 1 forms a flat face F on the work material W by using the flat face machining cutting edge 21 (the cutting edge 7 of the cutting insert 20 for working the flat face) that extends to conform to the virtual plane that is perpendicular to the axis O among a plurality of cutting edges 7 that are provided at intervals in the circumferential direction. In addition, the recessed groove machining cutting edge 31 (the cutting edge 7 of the cutting insert 30 for working the recessed grooves) that projects further toward the front end side than the flat face machining cutting edge 21 on the axis O direction is used among the plurality of cutting edges 7 to form recessed grooves G with V-shaped sections that are recessed from the flat face F in the work material W.

That is, the surface roughness of the work material W is within the predetermined range by forming the flat face F and the recessed grooves G in the work material W. Specifically, the milling work is performed such that the flat face F is retained between the recessed grooves G formed in the machined surface of the work material W as illustrated in FIGS. 9A and 9B. In this manner, the depth of the recessed grooves G (the distance from the flat face F to the bottom portions of the recessed grooves G) is constantly maintained, and the surface roughness is within the predetermined range.

The groove widths of the recessed grooves G are set to be the same as one another in the machined surface of the work material W after the milling illustrated in FIGS. 9A and 9B, and specifically, the target value of all the groove widths is set to be 0.25 mm. Also, the depths of the recessed grooves G are set to be the same as one another. In addition, in FIG. 9B, cut feeding (feeding per edge) is set to be ½ times, or alternatively, the cut feeding is set to be the same while the number of edges (the number of cutting inserts 30 for working the recessed grooves) are set to be a double the number illustrated in FIG. 9A. In FIG. 9B, the groove pitch of the recessed grooves G is set to be ½ times (half) the groove pitch illustrated in FIG. 9A. Meanwhile, the surface roughness of the machined surface of the work material W is within the prescribed range both in FIGS. 9A and 9B.

Specifically, a change in cut feeding affects a change in intervals (groove pitch) between the recessed grooves G. The cut feeding depends on the amount of cut feeding per unit rotation of the cutter and a number and positions of the recessed groove machining cutting edges 31 attached to the cutter. In addition, as for a working position (the position of the indexable milling cutter 1 relative to the work material W during working), the intervals between the recessed grooves G become narrower from the cutter center toward the outside of the cutter in the radial direction (the direction that perpendicularly intersects the moving direction M among the radial directions), and the recessed grooves G overlap with one another and the flat face F becomes zero at a position of the end portion in the outer radial direction of the cutter, to which the recessed groove machining cutting edge 31 is attached, in the radial direction, as illustrated in FIG. 8B. A prescribed range of the working position depends on conditions in a strict sense. Note that as for a cutting speed, a change in the cutting speed does not greatly affects the surface roughness under a condition that cutting is performed normally while the flat face F is retained in the machined surface.

Therefore, whether or not the surface roughness within the prescribed range is obtained can be determined on the basis of whether or not the flat face F is retained in the machined surface and depends on the relationship between the widths of the recessed grooves G and the amount of cut feeding per rotation of the cutter. Also, an effective working position for obtaining the surface roughness in the prescribed range is decided at the same time.

In addition, arc-shaped recessed grooves G that protrude toward the front side in the moving direction M are formed in the work material W by the recessed groove machining cutting edge 31 (the cutting edge 7 of the cutting insert 30 for working the recessed grooves) positioned further on the front side (the left side of the axis O in FIG. 8B) than the axis O of the tool body 2 in the moving direction M toward the radial direction of the tool body 2, and arc-shaped recessed grooves G that protrude toward the rear side in the moving direction M are formed in the work material W by the recessed groove machining cutting edge 31 positioned further on the rear side (the right side of the axis O in FIG. 8B) than the axis O in the moving direction M, during the milling as illustrated in FIG. 8B. Then, the mesh grooves (cross-hatching grooves) are formed in the work material W by causing the arc-shaped recessed grooves G that protrude toward the front side in the moving direction M and the arc-shaped recessed grooves G that protrude toward the rear side to intersect with each other. Note that the arc-shaped recessed grooves G that protrude toward the front side and the arc-shaped recessed grooves G that protrude toward the rear side are alternately formed in the moving direction M in the radial direction in the machined surface of the work material W at this time.

Figure 10A:
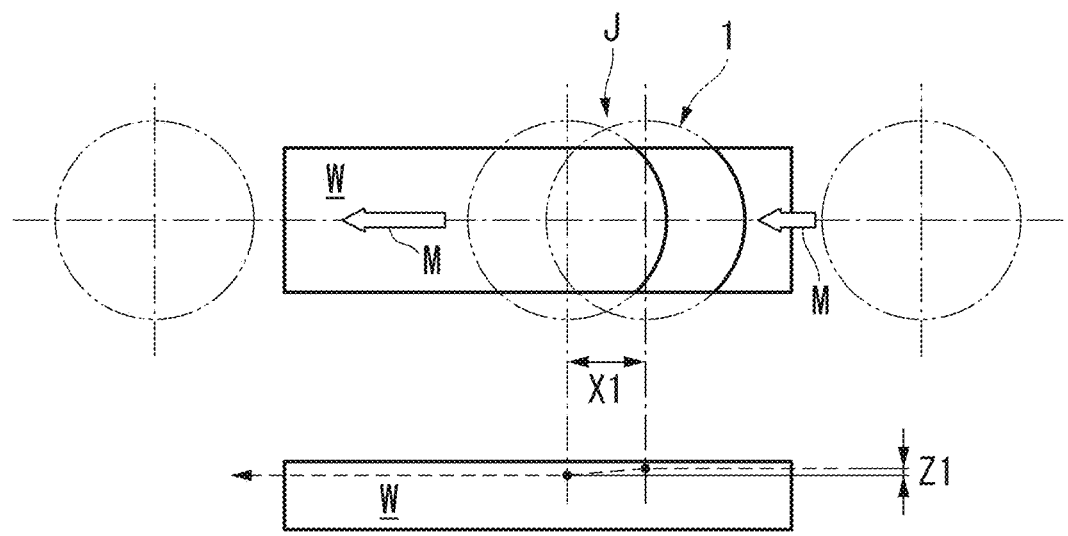
FIG. 10A is a diagram for describing tool passing for cutter-in (shift to the facing) in the milling using the indexable milling cutter.
Figure 10B:
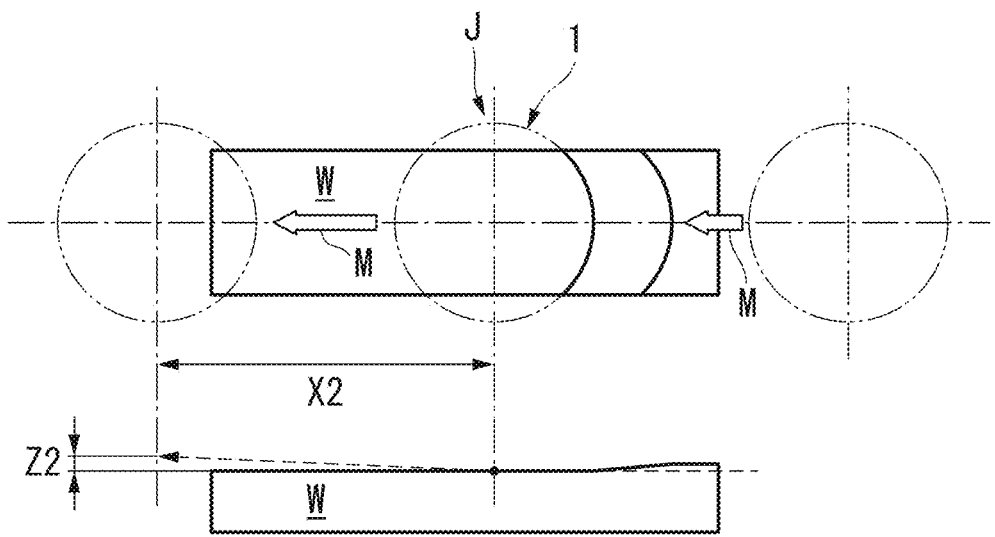
FIG. 10B is a diagram for describing tool passing for cutter-out (completion of facing) in the milling using the indexable milling cutter.

In addition, FIG. 10A illustrates a diagram for describing movement (tool passing) of the indexable milling cutter 1 relative to the work material W in an initial working process (in the time of cutting in) in which the milling of the work material W with the indexable milling cutter 1 is started. FIG. 10B illustrates a diagram for describing movement (tool passing) of the indexable milling cutter 1 relative to the work material W in a final working process (in the time of the cutter out) in which the milling of the work material W with the indexable milling cutter 1 is ended.

Note that in FIGS. 10A and 10B, the width of the face to be machined (a face to be subjected to the milling) of the work material W is reduced relative to the working diameter (specifically, a diameter of a rotation locus formed by rotating the recessed groove machining cutting edge 31 about the axis O) of the indexable milling cutter 1.

As illustrated in FIG. 10A, the front end face of the tool body 2 is arranged to face the face to be machined of the work material W in the axis O direction in the initial machining process, the tool body 2 is moved and approach the work material W in the axis O direction while the tool body 2 is moved in the radial direction, 1 is performed thereon, and the processing then proceeds to facing.

Specifically, the tool body 2 is moved in the moving direction M in the radial direction relative to the work material W first (by moving the tool body 2 horizontally), facing is performed thereon, an when the tool body 2 is arranged at a predetermined position J in the face to be machined, the tool body 2 is moved and approach the work material W while the tool body 2 is moved in the moving direction M in the radial direction (by lowering the tool body 2), ramping cut is performed thereon (while the tool body 2 is moved obliquely downward in an inclined manner), the tool body 2 is then moved in the moving direction M in the radial direction relative to the work material W (by moving the tool body 2 horizontally), and facing is performed thereon.

Note that in the aforementioned ramping cut at the time of the cutting-in, working is performed in a gently inclined manner such that the amount Z1 of lowering in the axis O direction=about 0.05 mm per length X1=20 mm in the moving direction M, for example.

As illustrated in FIG. 10B, the facing is performed on the entire face to be machined of the work material W, the tool body 2 is moved away from the work material W in the axis O direction while the tool body 2 is moved in the radial direction at a position overlapping with the aforementioned position (predetermined position J) at which the processing has proceeded to the facing, in the final machining process. Note that the aforementioned working method is effective particularly in a case in which the work material W has a bowl shape and the machined surface of the work material W has an endless annular shape.

Specifically, the tool body 2 is moved in the moving direction M in the radial direction relative to the work material W (by moving the tool body 2 horizontally), the facing is performed thereon, and when the tool body 2 is arranged at the predetermined position J, the facing on the entire part to be worked of the work material W is ended. Note that the tool body 2 moves such that the tool body 2 overlaps with the same track as that in the initial machining process at the time of ending the facing. Thereafter, the tool body 2 is moved away (lift) from the work material W in the axis O direction while the tool body 2 is moved in the moving direction M in the radial direction from the predetermined position J (by moving the tool body 2 obliquely upward in an inclined manner).

Note that the aforementioned inclined movement at the time of taking the cutter out is performed with a gentle inclination such that the amount Z2 of lifting in the axis O direction=about 1 mm per length X2=100 mm in the moving direction M, for example.

Therefore, the amount of displacement in the axis O direction per unit length in the moving direction M in the radial direction when the tool body 2 is moved and approach the work material W in the axis O direction while the tool body 2 is moved in the radial direction and the milling is performed thereon (that is, in the time of cutting-in) is smaller than the amount of displacement in the axis O direction per unit length in the moving direction M in the radial direction when the tool body 2 is moved away from the work material W in the axis O direction while the tool body 2 is moved in the radial direction after completely finishing the facing (that is, in the time of the cutter out) in the embodiment. That is, the amount of displacement in the axis O direction per unit length in the moving direction M (that is, the inclination of the inclined movement) is smaller at the time of cutting-in than at the time of taking the cutter out.

Effects and Advantages of the Embodiment

Although the embodiment described above is similar to the milling cutter in the related art in that the smooth flat face F is formed by performing the milling on the work material W, the embodiment has a technical feature that the recessed grooves G are formed in the flat face rather than forming only the smooth flat face F.

Specifically, the recessed groove machining cutting edge 31 that projects toward the further tool front end side than the cutting edge 7 (flat face machining cutting edge 21) for working the flat face F is provided, and the recessed grooves G with the V-shaped sections are formed in the flat face F of the work material W by the first inclined portion 41 and the second inclined portion 42 of the recessed groove machining cutting edge 31 in the embodiment. Also, the depths of the plurality of recessed grooves G from the flat face F is substantially the same as one another (that is, the depths of the plurality of recessed grooves G are constant). In this manner, the machined surface with prescribed surface roughness, which is surface roughness substantially corresponding to the distance (depth) between the flat face F and the deepest portion of the recessed grooves G is formed in the work material W. Note that the sectional shape of the deepest portion of the recessed grooves G is set to be a sharp corner portion with an obtuse angle as in the embodiment, for example, or a sharp corner portion with a right angle, a convex curved portion with a small curvature radius, or the like such that the sectional shape corresponds to the shape of the tip portion 43 that is configured to connect the first inclined portion 41 and the second inclined portion 42 of the recessed groove machining cutting edge 31.

That is, the milling is performed on the work material W for the flat face F as in the related art while the milling is performed on the flat face F for the recessed grooves G during the milling (same process) in the embodiment. It is possible to precisely apply the surface roughness within the prescribed range (predetermined range) to the machined surface (the surface on which the milling has been performed) of the work material W by such a simple and special method.

Specifically, it is possible to highly precisely form a machined surface with a surface roughness within a predetermined range of about several μm to several tens of μm in terms of Rz (ten-point average roughness), for example, in the work material W. That is, it is possible to set the surface roughness of the work material W within a required range of surface roughness that is not too fine and not too rough (surface roughness that falls between a predetermined upper limit value and a lower limit value). In addition, it is possible to control (manage) the surface roughness of the work material W.

Further, there are less influences of cutting conditions such as cutting feeding and working position according to the embodiment. Therefore, it is possible to stably form the machined surface with the surface roughness in the prescribed range on the work material W under various cutting conditions.

Therefore, it is preferable to apply the present invention to milling for mating faces of a pair of case bodies, such as a clutching housing and a transmission case for a vehicle, for example. In this manner, it is possible to precisely apply prescribed surface roughness to the mating faces and to significantly enhance holding properties and a sealing effect of a sealing agent interposed between the mating faces.

In addition, since the recessed grooves G with the V-shaped sections are formed by the first inclined portion 41 and the second inclined portion 42 of the recessed groove machining cutting edge 31, it is possible to stably form the recessed grooves G with a constant shape in the embodiment. Also, it is possible to make it easy to visually recognize the fact that the recessed grooves G have been formed in the machined surface of the work material W after the milling. Note that in terms of enhancing the visibility, it is preferable that the tip portion 43 that is configured to connect the first inclined portion 41 and the second inclined portion 42 of the recessed groove machining cutting edge 31 be formed into a sharp corner portion (an obtuse angle, a right angle, or the like) rather than a convex curved portion with a small curvature radius due to a large amount of reflection.

According to the embodiment, it is possible to precisely apply the surface roughness in the prescribed range to the work material W simply by performing the milling without complicating the manufacturing as described above.

In the embodiment, since the plurality of cutting edges 7 provided in the tool body 2 includes a plurality of flat face machining cutting edges 21, and the recessed groove machining cutting edge 31 projects toward the front end side in the axis O direction relative to the flat face machining cutting edge 21 at the forefront end positioned on the forefront front end side in the axis O direction among these flat face machining cutting edges 21, the following effects and advantages are achieved.

That is, in this case, the final height position of the flat face F of the work material W in the axis O direction is decided when the milling is performed on the work material W with the flat face machining cutting edge 21 at the forefront end positioned on the forefront front end side in the axis O direction among the plurality of flat face machining cutting edges 21 provided in the indexable milling cutter 1. Then, the recessed groove machining cutting edge 31 forms the recessed groove G with the predetermined depth in the flat face F at the final height position. Therefore, the surface roughness of the machined surface formed in the work material W becomes highly precise and is closer to a target value (center value) in the prescribed range.

In addition, since the flat face machining cutting edge 21 at the forefront end is arranged to be adjacent to the recessed groove machining cutting edge 31 of the tool body 2 in the tool rotational direction T, the following effects and advantages are achieved in the embodiment.

That is, in this case, the recessed groove machining cutting edge 31 is arranged immediately behind the flat face machining cutting edge 21 positioned at the tool forefront end (immediately behind the flat face machining cutting edge 21 on the side opposite to the tool rotational direction T). Therefore, the recessed groove machining cutting edge 31 successively cut into the flat face F and forms the recessed grooves G immediately after the final height position of the flat face F of the work material W in the axis O direction is decided. Therefore, the depths of the recessed groove G tend to be values that are close to the prescribed value, and the surface roughness of the machined surface formed on the work material W tends to be highly precise and close to the target value.

Theoretically, the aforementioned advantage should be obtained as long as the projection amount S of the recessed groove machining cutting edge 31 relative to the flat face machining cutting edge 21 at the forefront end toward the front end side in the axis O direction is precisely set even if the position of the recessed groove machining cutting edge 31 in the circumferential direction in the tool body 2 is not arranged in the vicinity of the flat face machining cutting edge 21 at the forefront end in the circumferential direction. However, since deformation in accordance with stiffness of the milling cutter 1, a measurement error at the time of setting, and the like occurs in practice, there is a case in which it is difficult to precisely set the projection amount S. Thus, the variations in the setting, displacement due to the deformation, and the like are suppressed, and the precision of the projection amount S is stabilized by arranging the recessed groove machining cutting edge 31 immediately behind the flat face machining cutting edge 21 positioned at the tool forefront end (immediately behind the flat face machining cutting edge 21 on the side opposite to the tool rotational direction T) in the embodiment. That is, it is desirable to arrange the recessed groove machining cutting edge 31 in the vicinity of the flat face machining cutting edge 21 at the forefront end in the circumferential direction in consideration of stability of the working precision.

Specifically, there is a case in which the axis O of the tool body 2 is arranged to be slightly inclined rather than being arranged to be perpendicular to the face to be machined (the surface on which the milling is performed) of the work material W (so-called a heel angle is applied) in the milling cutter in general. In addition, if there is deflection (deflection from the flat face F to be worked) of a spindle (main axis), the depths of the recessed grooves G from the flat face F often deviates from the prescribed value (range).

Meanwhile, according to the aforementioned configuration of the embodiment, it is possible to reliably suppress influences of the inclination of the axis O of the tool body 2, the deflection, and the like on quality of the worked product since the recessed groove machining cutting edge 31 successively cuts in the worked material immediately after the flat face machining cutting edge 21 at the forefront end even if a heel angle is applied to the tool body 2 or there is deflection in the spindle.

Note that although the flat face machining cutting edge 21 at the forefront end is arranged to be adjacent to the recessed groove machining cutting edge 31 of the tool body 2 in the tool rotational direction T in the embodiment, the flat face machining cutting edge 21 may be arranged to be adjacent to the recessed groove machining cutting edge 31 on the side opposite to the tool rotational direction T instead. It is also possible to similarly stabilize the working precision in this case.

In addition, since the recessed groove machining cutting edge 31 is arranged within the range of the length P in the radial direction or inside the radial direction of the rotation locus that is formed by causing the flat face machining cutting edge 21 to rotate about the axis O, the following effects and advantages are achieved in the embodiment.

That is, in this case, it becomes easy to stably apply the prescribed surface roughness to the machined surface of the work material W. In a case in which the recessed groove machining cutting edge 31 is arranged within the range of the length P of the rotation locus, which is formed by causing the flat face machining cutting edge 21 to rotate in the circumferential direction, in the radial direction, in particular, it becomes easy to precisely manage the projection amount S of the recessed groove machining cutting edge 31 from the flat face machining cutting edge 21 toward the front end side in the axis O direction. In addition, since the recessed groove machining cutting edge 31 substantially simultaneously cuts in the flat face F on which the flat face machining cutting edge 21 performs the milling (cuts in the flat face at substantially the same feeding position), it becomes easier to form the machined surface with the surface roughness in the prescribed range on the work material W.

Note that since satisfactory surface roughness obtains (there becomes no flat face F) at the portion at which the rotation locus of the recessed groove machining cutting edge 31 of the cutter overlap in the positional relationship between the work material W and the milling cutter 1 and in the vicinity thereof and the surface roughness cannot be controlled, it is necessary to appropriately select a cutter diameter and a cutter track with respect to the working width (the width of the machined surface) of the work material W in order to avoid working at these portions.

In addition, since the angle θ formed between the first inclined portion 41 and the second inclined portion 42 of the recessed groove machining cutting edge 31 is an obtuse angle or a right angle, and the angle θ is set to be an obtuse angle in the embodiment, the following effects and advantages are achieved.

That is, in this case, the angle θ (point angle) formed between the first inclined portion 41 and the second inclined portion 42 of the recessed groove machining cutting edge 31 is an obtuse angle or a right angle rather than an acute angle. Therefore, the end tip strength of the recessed groove machining cutting edge 31 is secured while the recessed grooves G are reliably formed in the work material W by the recessed groove machining cutting edge 31. Therefore, the fracturing suppression effect of the recessed groove machining cutting edge 31 is obtained, and it is possible to stably perform the milling on the recessed grooves G in the work material W over a long period of time.

In addition, it is possible to secure a wide groove width of the recessed grooves G formed in the machined surface of the work material W and to thereby improve visibility of the recessed grooves G after the milling. Further, it is possible to make it easier for the sealing agent to be retained in the vicinity of the front face of the machined surface (the vicinity of the openings rather than the bottom portion of the recessed grooves G), for example, in accordance with the wide groove width of the recessed grooves G and to thereby expect an improvement in the sealing effect.

In addition, since the first inclined portion 41 and the second inclined portion 42 of the recessed groove machining cutting edge 31 are formed into a linearly symmetric shape with respect to the virtual straight line C that passes through the tip portion 43 and is parallel to the axis O as a symmetric axis, the following effects and advantages are achieved in the embodiment.

That is, in this case, since the first inclined portion 41 positioned inside the virtual straight line C (symmetric axis) passing through the tip portion 43 in the radial direction and the second inclined portion 42 positioned outside the virtual straight line C in the radial direction have shapes that are linearly symmetric with each other in the recessed groove machining cutting edge 31, it is possible to easily manufacture it.

Also, since the sectional shapes of the recessed grooves G formed in the machined surface of the work material W are formed into the linearly symmetric shape in accordance with the shape of the recessed groove machining cutting edge 31, it is possible to improve the visibility of the recessed grooves G regardless of a viewing angle or the like.

Figure 16A:
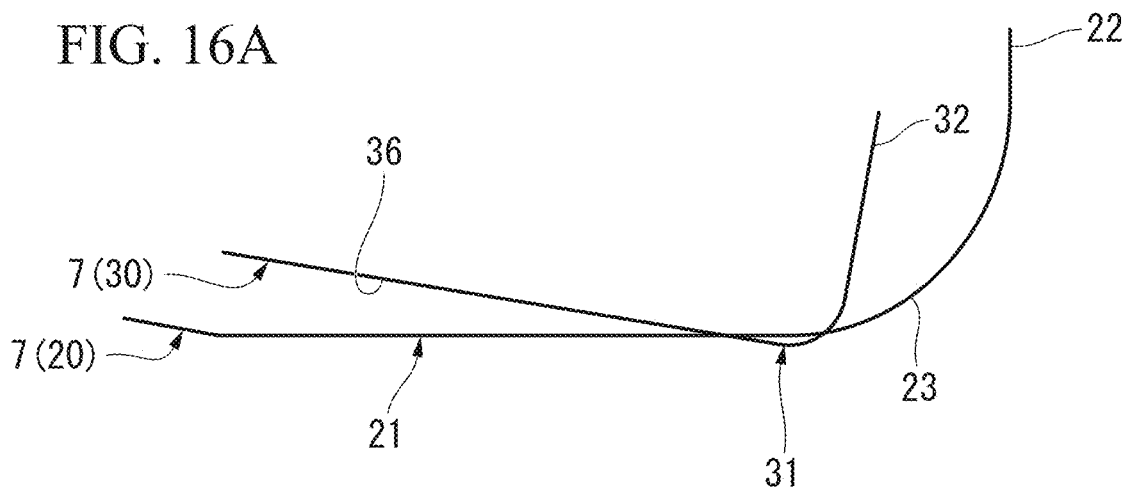
FIG. 16A is a diagram illustrating the A part (flat face machining cutting edge) in FIG. 4 and an H part (recessed groove machining cutting edge) in FIG. 15 in an enlarged manner and a diagram for describing a positional relationship between rotation locus of the cutting edges.
Figure 16B:
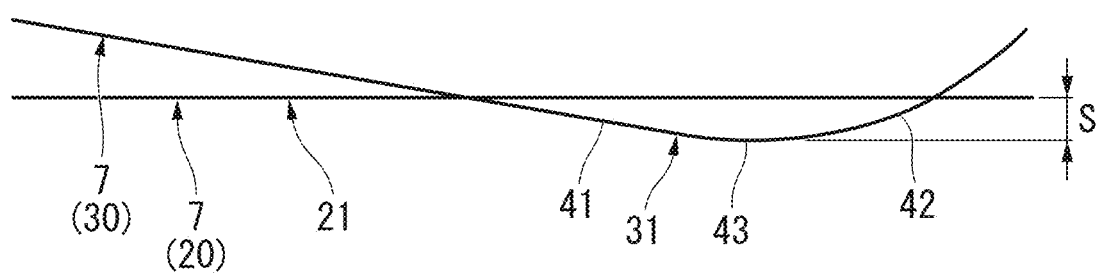
FIG. 16B is a diagram illustrating main parts in FIG. 16A in an enlarged manner.

Note that the first inclined portion 41 and the second inclined portion 42 are preferably not to be formed into linearly symmetric shapes (preferably formed into asymmetric shapes) with the virtual straight line C interposed therebetween from the viewpoint of equalizing a cutting resistance, a chip form, and the like between the first inclined portion 41 and the second inclined portion 42 of the recessed groove machining cutting edge 31. In addition, it is desirable that the inclination of the first inclined portion 41 (an inclination angle relative to the virtual plane (not illustrated) that is perpendicular to the axis O) be set to be smaller than the inclination of the second inclined portion 42 when the rake face of the recessed groove machining cutting edge 31 is viewed on the front side, as illustrated in FIGS. 16A and 16B, in this case.

Specifically, a circumferential speed at the first inclined portion 41 positioned on an inner side in the radial direction is smaller than a circumferential speed at the second inclined portion 42 positioned on an outside in the radial direction in the recessed groove machining cutting edge 31 during the cutting working. Therefore, it is necessary to set the amount of cutting (a cutting margin per unit cutting) at the first inclined portion 41 to be greater than the amount of cutting at the second inclined portion 42 in order to equalize the cutting resistances and the chip forms between these first and second inclined portions 41 and 42.

Therefore, the recessed groove machining cutting edge 31 is preferably formed into a linearly asymmetric shape with respect to the virtual straight line C that passes through the tip portion 43 and is parallel to the axis O. In addition, it is desirable that the inclination of the first inclined portion 41 be set to be smaller than the inclination of the second inclined portion 42 (the inclination is gentler) since it becomes easier to secure a large amount of cutting at the first inclined portion 41 as compared with the amount of cutting at the second inclined portion 42.

Note that inclination angles of the first and second inclined portions 41 and 42 are individually set in consideration of a cutting balance and a chip form of cutting edge portions (first inclined portion 41 and the second inclined portion 42) on the left and right sides (on the inner side in the radial direction and the outside in the radial direction) with respect to the virtual straight line C at the center when the rake face of the recessed groove machining cutting edge 31 is viewed on the front side.

In addition, since the milling cutter according to the embodiment is an indexable milling cutter 1 in which the plurality of insert attachment seats 4 are formed at the outer peripheral part of the front end of the tool body 2 with intervals provided between one another in the circumferential direction and the cutting inserts 20 and 30 that have the cutting edges 7 are detachably attached to the plurality of insert attachment seats 4, the following effects and advantages are achieved.

That is, in this case, it is possible to renew the cutting edges 7 by replacing the cutting inserts 20 and 30 in a case in which abrasion, damages, and the like of the cutting edges 7 occur, for example. That is, it is possible to stabilize cutting efficiency by maintaining high sharpness of the cutting edges 7 and to simply and reasonably address the replacement of the cutting edges.

Specifically, the cutting insert 30 that has the recessed groove machining cutting edge 31 has a long cutting edge portion (sliding side) that slides along the work material W, and in accordance with this, the amount of abrasion increases, for example. However, it is possible to easily address the increase by replacing the cutting insert 30.

FIGS. 11 to 16B illustrates modification examples of the cutting insert 30 for working the recessed grooves described in the embodiment.

Figure 12A:
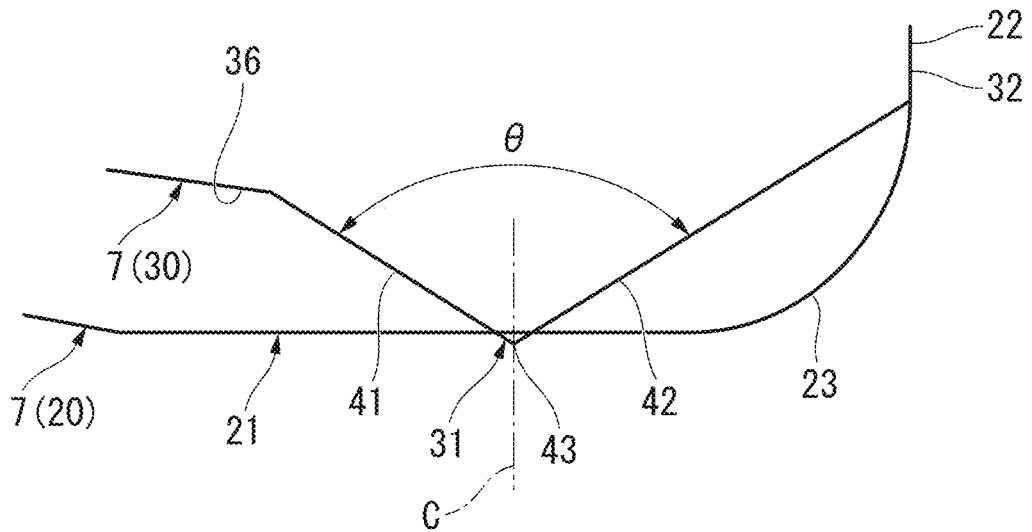
FIG. 12A is a diagram illustrating the A part (flat face machining cutting edge) in FIG. 4 and a D part (recessed groove machining cutting edge) in FIG. 11 in an enlarged manner and is a diagram for describing a positional relationship between rotation locus of these cutting edges.
Figure 12B:
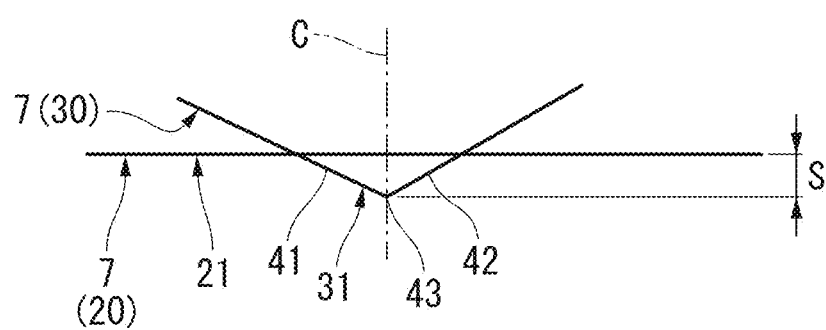
FIG. 12B is a diagram illustrating main parts in FIG. 12A in an enlarged manner.

In the modification example illustrated in FIGS. 11, 12A, and 12B, the cutting edge 7 of the cutting insert 30 has the recessed groove machining cutting edge 31 (front edge) that has a convex V shape that projects toward the outside of the insert in the longitudinal direction of the insert body 11 and the outer circumferential edge 32 that extends in a straight line shape in the longitudinal direction of the insert body 11, and the cutting edges 31 and 32 are connected directly to each other without corner edge interposed therebetween.

In addition, the angle θ (point angle) formed between the first inclined portion 41 and the second inclined portion 42 of the recessed groove machining cutting edge 31 is an obtuse angle, and specifically, the angle θ is 120°, for example. In addition, the first inclined portion 41 and the second inclined portion 42 are formed into linearly symmetric shapes with respect to the virtual straight line C that passes through the tip portion 43 and is parallel to the axis O of the tool body 2 as the symmetric axis.

It is also possible to obtain effects and advantages that are similar to those in the aforementioned embodiment in the modification example illustrated in FIGS. 11, 12A, and 12B.

Figure 13:
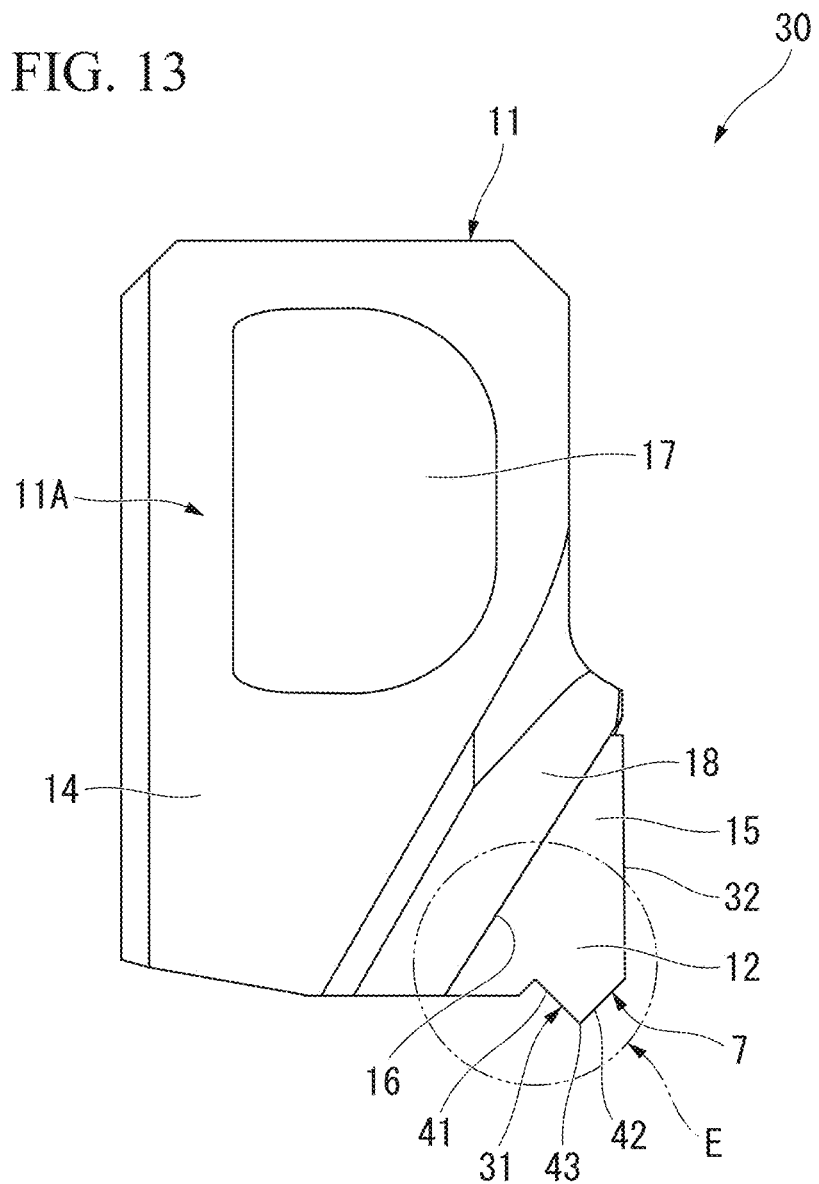
FIG. 13 is a plan view illustrating a modification example of a cutting insert (an insert for machining recessed grooves).
Figure 14A:
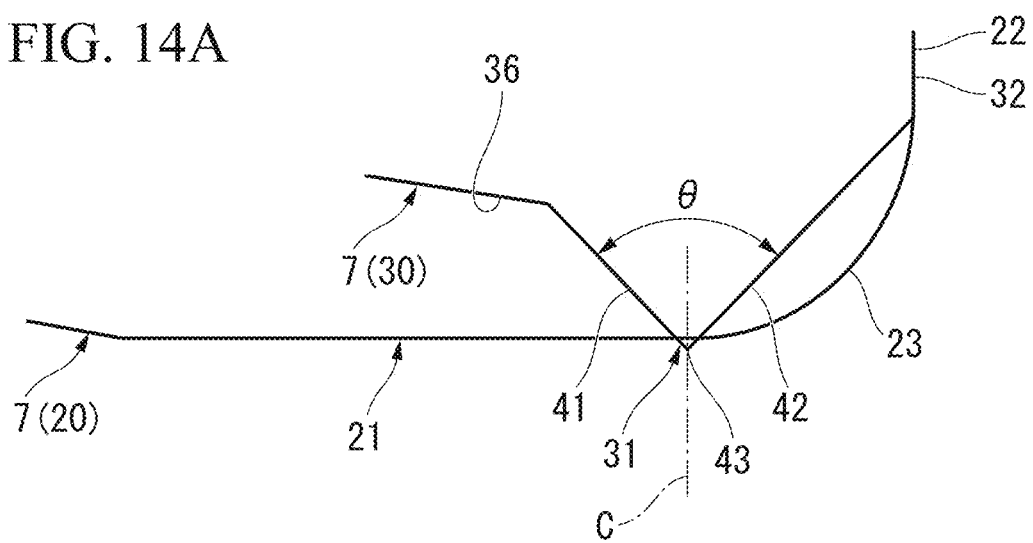
FIG. 14A is a diagram illustrating the A part (flat face machining cutting edge) in FIG. 4 and an E part (recessed groove machining cutting edge) in FIG. 13 in an enlarged manner and is a diagram for describing a positional relationship between rotation locus of the cutting edges.
Figure 14B:
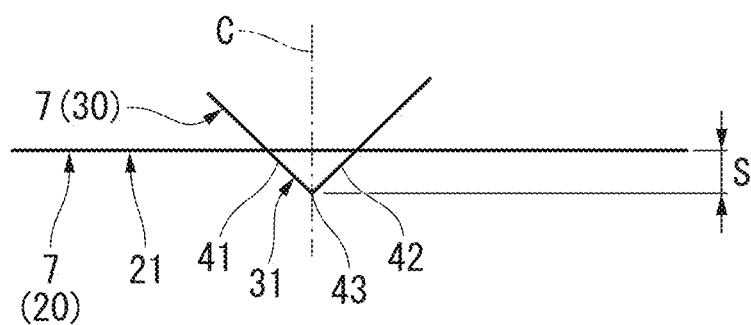
FIG. 14B is a diagram illustrating main parts in FIG. 14A in an enlarged manner.

In addition, the cutting edge 7 of the cutting insert 30 also has a recessed groove machining cutting edge 31 (front edge) that has a convex V shape that projects toward the outside of the insert in the longitudinal direction of the insert body 11 and the outer circumferential edge 32 that extends in a straight line shape in the longitudinal direction of the insert body 11, and the cutting edges 31 and 32 are connected directly to each other without a corner edge interposed therebetween in the modification example illustrated in FIGS. 13, 14A, and 14B.

In addition, the angle θ (point angle) formed between the first inclined portion 41 and the second inclined portion 42 of the recessed groove machining cutting edge 31 is a right angle, and specifically, the angle θ is 90°. In addition, the first inclined portion 41 and the second inclined portion 42 is formed into linearly symmetric shapes with respect to the virtual straight line C that passes through the tip portion 43 and is parallel to the axis O of the tool body 2 as the symmetric axis.

It is also possible to obtain effects and advantages that are similar to those in the aforementioned embodiment in the modification example illustrated in FIGS. 13, 14A, and 14B.

Figure 15:
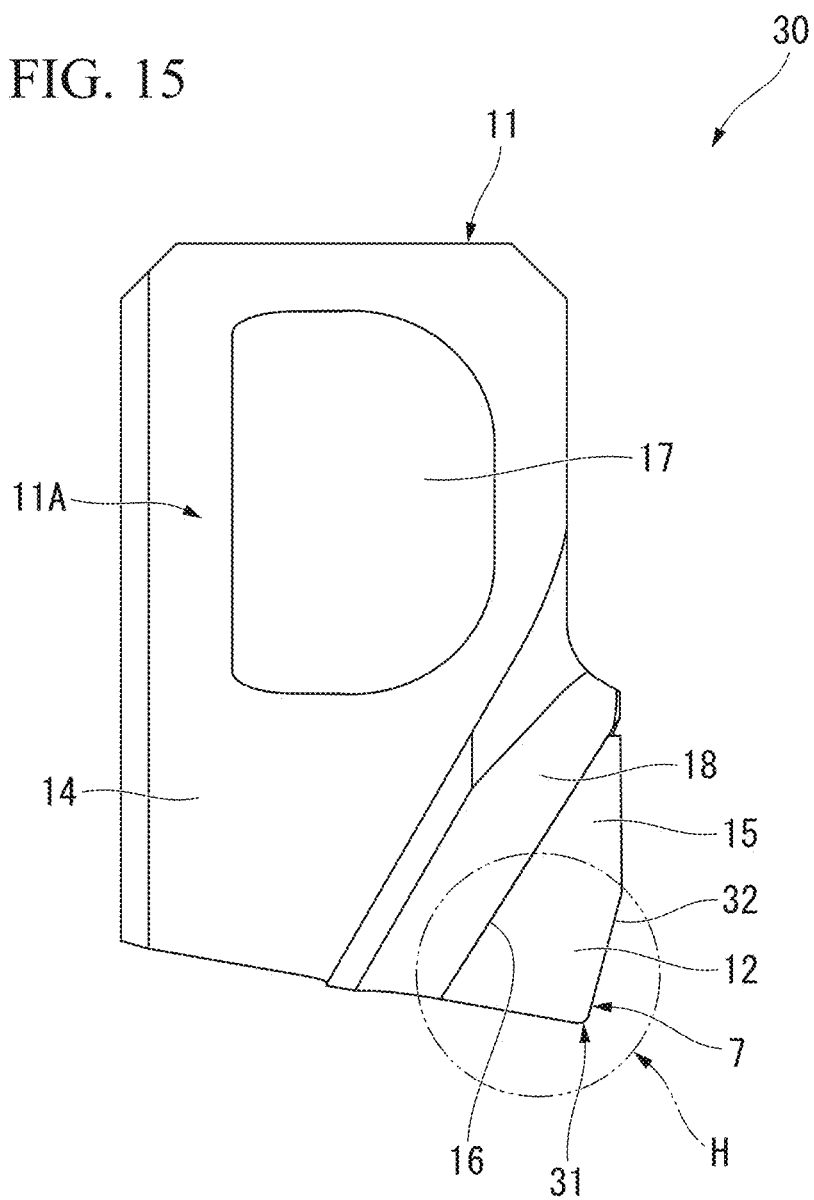
FIG. 15 is a plan view illustrating a modification example of a cutting insert (an insert for forming recessed grooves).

In addition, in the modification example illustrated in FIGS. 15, 16A, and 16B, the cutting edge 7 of the cutting insert 30 has the recessed groove machining cutting edge 31 (front edge) that has a convex V shape that projects toward the outside of the insert in the longitudinal direction of the insert body 11 and the outer circumferential edge 32 with a straight line shape that is gradually inclined toward the inside of the insert (the inner side in the radial direction) in the lateral direction toward the outside of the insert (the front end side in the axis O direction) in the longitudinal direction of the insert body 11.

In addition, the first inclined portion 41 has a straight line shape that extend toward the front end side in the axis O direction toward the outside of the tool body 2 in the radial direction (the right side in FIGS. 16A and 16B) in the recessed groove machining cutting edge 31. The second inclined portion 42 has a convex curved shape that is arranged outside the first inclined portion 41 in the radial direction and extends toward the base end side in the axis O direction toward the outside in the radial direction. Also, the tip portion 43 that is configured to connect the first inclined portion 41 and the second inclined portion 42 has a convex curved shape that protrudes toward the tool front end side. In addition, the first inclined portion 41 and the second inclined portion 42 are formed into asymmetric shapes (that is, not in a linearly symmetric shapes) with respect to the virtual straight line C (not illustrated) that passes through the tip portion 43 and is parallel to the axis O of the tool body 2.

It is also possible to obtain effects and advantages that are similar to those in the aforementioned embodiment in the modification example illustrated in FIGS. 15, 16A, and 16B (however, except for the advantages of the aforementioned linearly symmetric shapes).

In addition, since the surface roughness of the work material W is set within a predetermined range by forming the flat face F and the recessed grooves G in the work material W, it is possible to reliably enhance the holding property and the sealing effect, for example, of the sealing agent in the machined surface on which the milling is performed up to a prescribed performance.

In addition, since the arc-shaped recessed grooves G that protrude toward the front side in the moving direction M are formed in the work material W by the recessed groove machining cutting edge 31 positioned further on a front side than the axis O of the tool body 2 in the moving direction M of the tool body 2 in the radial direction, the arc-shaped recessed grooves G that protrude toward the rear side in the moving direction M are formed in the work material W by the recessed groove machining cutting edge 31 positioned further on the rear side than the axis O of the tool body 2 in the moving direction M, and the mesh grooves are formed in the work material W by causing these recessed grooves G to intersect with one another, the following effects and advantages are achieved in the embodiment.

That is, in this case, the mesh grooves (crosshatched grooves) in which the recessed grooves G intersects with one another are formed in the machined surface of the work material W after the milling. Therefore, it is possible to make it easy to visually recognize the recessed grooves G in the machined surface of the work material W regardless of the angle and the like of viewing the recessed grooves G.

In addition, the effect of the formation of the recessed grooves G in the machined surface of the work material W becomes stable. Specifically, the recessed grooves G formed in the machined surface of the work material W communicate with each other. Therefore, in a case in which the sealing agent is held by the recessed grooves G, for example, deviation in the amount of sealing agent held is naturally solved through the recessed grooves G that communicate with each other even if such deviation occurs at each part in the machined surface at the timing at which the sealing agent is supplied to the recessed grooves G. That is, since it is possible to uniformly hold the sealing agent over the entire machined surface, the sealing effect becomes stable. In addition, since the arrangement intervals between the recessed grooves G decreases in the machined surface of the work material W, it is possible to significantly reduce a variation in surface roughness in the machined surface.

In addition, since the angle θ between the first inclined portion 41 and the second inclined portion 42 of the recessed groove machining cutting edge 31 is an obtuse angle or a right angle, and the size of the angle θ is set in accordance with the surface roughness to be applied to the work material W, the following effects and advantages are achieved in the embodiment.

That is, in this case, it is possible to achieve effects and the advantages that are similar to the aforementioned effects and advantages of the obtuse angle or the right angle since the angle θ (point angle) formed between the first inclination angle 41 and the second inclined portion 42 of the recessed groove machining cutting edge 31 is an obtuse angle or a right angle rather than an acute angle.

Further, since the size of the angle θ (point angle) of the recessed groove machining cutting edge 31 is set (appropriately selected) in accordance with the surface roughness (target surface roughness) to be applied to the work material W, the following effects and advantages are achieved with the aforementioned configuration.

For example, it is assumed that the surface roughness to be applied to the work material W is within a range of 5 to 20 µm, 20 to 40 µm, and 40 to 60 µm. In this case, the size of the point angle θ of the recessed groove machining cutting edge 31 is set to 170° (large point angle), for example, when the recessed grooves G with small surface roughness in the aforementioned range of 5 to 20 µm are formed in the machined surface of the work material W. In addition, the size of the point angle θ of the recessed groove machining cutting edge 31 is set to 160° (the point angle with an intermediate size) when the recessed grooves G with intermediate surface roughness within the aforementioned range of 20 to 40 µm are formed. In addition, the size of the point angle θ of the recessed groove machining cutting edge 31 is set to 150° (small point angle), for example, when the recessed grooves G with large surface roughness within the aforementioned range of 40 to 60 µm. That is, it is possible to stabilize the groove width (the width of the openings of the recessed grooves G) of the recessed grooves G and the number of the grooves formed in the machined surface of the work material W and to make it easy to view the recessed grooves G by reducing the size of the point angle θ of the recessed groove machining cutting edge 31 as the surface roughness to be applied to the work material W increases (as the depths of the recessed grooves G become deeper).

In addition, since when the milling is performed on the work material W that has the face to be machined with a reduced width as compared with the diameter of the rotation locus that is formed by rotating the recessed groove machining cutting edge 31 in the circumferential direction (the working diameter of the milling cutter), the tool body 2 is arranged to face the face to be machined in the axis O direction, the tool body 2 is moved to approach the work material W in the axis O direction while the tool body 2 is moved in the radial direction, milling is performed thereon, the processing then proceeds to the facing, and after the facing is performed on the entire face to be machined, the tool body 2 is moved away from the work material W in the axis O direction while the tool body 2 is moved in the radial direction at the position overlapping the position at which the processing has proceeded to eh facing (predetermined position J), the following effects and advantages are achieved in the embodiment.

That is, in this case, the tool body 2 is moved closer to the work material W in the axis O direction while the tool body 2 is moved in the radial direction from the state in which the tool body 2 is arranged to face the face to be machined of the work material W in the axis O direction and the milling is performed thereon, before shifting to the facing (the milling for forming the machined surface that is perpendicular to the axis O of the tool body 2). In addition, after the facing is performed in a general way on the face to be machined, the tool body 2 is moved away from the work material W in the axis O direction while the tool body 2 is moved in the radial direction at the position overlapping the position at which the processing has proceeded to the facing, and the processing is then ended.

It is difficult to form a track (so-called a cutter mark), which is unintentionally formed due to entrance and exit of the tool at the time of starting and ending the processing in the related art, in the machined surface of the work material W on which the milling has been performed in this manner. Therefore, according to the aforementioned configuration of the embodiment, it is possible to prevent the cutter mark from being formed in the machined surface of the work material W, and the recessed grooves G are uniformly formed over the entire machined surface. Therefore, the aforementioned effects and the advantages of the embodiment are stably achieved over the entire machined surface.

Note that orientations of the radial direction in which the tool body 2 is moved relative to the work material W when the processing proceeds to the facing and when the facing is ended are preferably the same as one another. Specifically, the track in the moving direction M in the radial direction in which the tool body 2 is moved when the processing proceeds to the facing and the track in the moving direction M in the radial direction in which the tool body 2 is moved when the facing is ended preferably coincide with each other. In this manner, it is possible to further significantly suppress occurrence of the cutter mark and to finish the machined surface with high quality.

In addition, since the amount of displacement in the axis O direction per unit length in the moving direction M toward the radial direction when the tool body 2 is moved and approach the work material W in the axis O direction while the tool body 2 is moved in the radial direction and the milling is performed thereon is smaller than the amount of displacement in the axis O direction per unit length in the moving direction M in the radial direction when the tool body 2 is moved away from the work material W in the axis O direction while the tool body 2 is moved in the radial direction after completely finishing the facing, the following effects and advantages are achieved in the embodiment.

That is, in this case, the inclination of the inclined movement (the amount of displacement in the axis O direction per unit length in the moving direction M) when the tool body 2 cuts in the work material W is smaller than the inclination of the inclination movement when tool body 2 of the cutter is taken out. Therefore, it is possible to effectively suppress a cutter mark that is easily created when the facing is started, in particular.

In addition, since the projection amount S by which the recessed groove machining cutting edge 31 projects toward the front end side in the axis O direction relative to the flat face machining cutting edge 21 at the forefront end is set to be a predetermined value in accordance with the prescribed surface roughness, the following effects and advantages are achieved in the embodiment.

That is, in this case, the surface roughness of the machined surface formed on the work material W becomes further highly precise by setting the projection amount S by which the recessed groove machining cutting edge 31 projects toward the front end side in the axis O direction relative to the flat face machining cutting edge 21 at the forefront end among the plurality of flat face machining cutting edge 21 to be a prescribed value in accordance with the prescribed surface roughness in advance. Specifically, the projection amount S is preferably set to a value that is smaller than the prescribed surface roughness (target surface roughness) as described above in relation to Equations 1 and 2 and the like.

Other Configurations Included in the Invention

Note that the present invention is not limited to the aforementioned embodiment and various modifications can be added without departing from the gist of the present invention.

Although the indexable milling cutter 1 has been described as the milling cutter in the aforementioned embodiment, for example, the present invention is not limited thereto. That is, the present invention can be applied to a non-indexable milling cutter in which a plurality of cutting edge chips are bonded to an outer peripheral part of a tip of a tip body by brazing or the like with intervals provided between one another around the axis.

In addition, although the flat face machining cutting edge 21 at the forefront end is arranged to be adjacent to the recessed groove machining cutting edge 31 in the tool rotational direction T or on the side opposite to the tool rotational direction T in the tool body 2 in the aforementioned embodiment, the present invention is not limited thereto, and the cutting edges 31 and 21 thereof may not be adjacent to each other in the circumferential direction. However, it is possible to significantly stabilize the surface roughness of the machined surface of the work material W by the cutting edges 31 and 21 being adjacent to each other in the circumferential direction as in the aforementioned embodiment, which is favorable.

In addition, although the cutting insert 30 for working the recessed grooves is provided at only one insert attachment seat 4, and the cutting inserts 20 for working the flat face are respectively provided at the other plurality of insert attachment seats 4 among the plurality of insert attachment seats 4 of the tool body 2 in the aforementioned embodiment, the preset invention is not limited thereto. That is, cutting inserts 30 for working the recessed grooves may be provided at a plurality of insert attachment seats 4 (that is, two or more cutting inserts 30 for working the recessed grooves may be provided in the tool body 2) for the plurality of insert attachment seats 4 of the tool body 2. In this case, it is possible to improve cutting feeding and the like during the milling and to improve working efficiency. Note that in the case in which the plurality of cutting inserts 30 for working the recessed grooves are provided, the groove pitches between the recessed grooves G formed in the machined surface of the work material W become uniform by these cutting inserts 30 being arranged at uniform intervals provided between one another in the circumferential direction in the tool body 2, which is favorable.

In addition, the respective configurations (components) described in the aforementioned embodiment, modification examples, notes, and the like may be combined without departing from the gist of the present invention, and additions, omissions, replacements, and other modifications of the configurations can be added thereto. Also, the present invention is not limited to the aforementioned embodiment and is limited only by the claims.

INDUSTRIAL APPLICABILITY

The milling cutter, the cutting insert, and the milling method according to the present invention can precisely apply surface roughness within a prescribed range to the work material simply using a milling without complicating manufacturing. Therefore, the milling cutter, the cutting insert, and the milling method have industrial applicability.

REFERENCE SIGNS LIST

1: Indexable milling cutter (milling cutter)
2: Tool body
4: Insert attachment seat
7: Cutting edge
11: Insert body
12: Rake face
13: Flank face
20: Cutting insert (cutting insert for machining flat face)
21: Flat face machining cutting edge (front edge)
30: Cutting insert (cutting insert for machining recessed grooves)
31: Recessed groove machining cutting edge (front edge)
41: First inclined portion
42: Second inclined portion
43: Tip portion
C: Virtual straight line (symmetric axis)
F: Flat face
G: Recessed groove
J: Predetermined position (position after shifting to facing)
M: Moving direction in radial direction
O: Axis
P: Length (length of flat face machining cutting edge in radial direction, edge length)
T: Tool rotational direction
W: Work material
θ: Angle (point angle)

The invention claimed is:

1. A milling method comprising the steps of:

providing a plurality of cutting edges at an outer peripheral part of a front end of a tool body that is configured to rotate about an axis with intervals provided between one another in a circumferential direction around the axis;

performing milling on the work material by moving the tool body to the work material in a radial direction that perpendicularly intersects the axis while the tool body is rotated in the circumferential direction;

forming a flat face on the work material by using a flat face machining cutting edge that extends along a virtual plane that is perpendicular to the axis among the plurality of cutting edges; and forming a recessed groove with a V-shaped section recessed from the flat face on the work material by using a recessed groove machining cutting edge that projects further toward a front end side in the axial direction than the flat face machining cutting edge among the plurality of cutting edges wherein the milling method further comprising:

when the milling is performed on the work material, for which a width of a face to be machined is smaller than a diameter of a rotation locus formed by rotating the recessed groove machining cutting edge in the circumferential direction, after arranging the tool body to face the face to be machined in the axial direction, moving the tool body closer to the work material in the axial direction while the tool body is moved in the radial direction, and performing milling, making transition to facing; and after completing the facing on the entire face to be machined, moving the tool body away from the work material in the axial direction while the tool body is moved in the radial direction, at a position that overlaps a position where the transition to the facing is made.

2. The milling method according to claim 1, wherein a surface roughness of the work material is set within a predetermined range by forming the flat face and the recessed groove in the work material.

3. The milling method according to claim 1, further comprising the steps of:

forming arc-shaped recessed grooves, which protrude toward a front side in a moving direction of the tool body in the radial direction, on the work material by the recessed groove machining cutting edge that is positioned further on a front side than the axis of the tool body along the moving direction;

forming arc-shaped recessed grooves, which protrude toward a rear side in the moving direction, on the work material by the recessed groove machining cutting edge that is positioned further on a rear side than the axis along the moving direction; and forming mesh grooves on the work material by intersecting the arc-shaped recessed grooves protruding toward the front side in the moving direction and the arc-shaped recessed grooves protruding toward the rear side in the moving direction.

4. The milling method according to claim 1, wherein the recessed groove machining cutting edge has
 a first inclined portion that extends toward the front end side in the axial direction toward an outside in a radial direction that perpendicularly intersects the axis,
 a second inclined portion that is arranged outside the first inclined portion in the radial direction and extends toward a base end side in the axial direction toward the outside in the radial direction, and
 a tip portion that is configured to connects the first inclined portion and the second inclined portion, an angle formed between the first inclined portion and the second inclined portion is an obtuse angle or a right angle, and a size of the angle is set in accordance with a surface roughness to be applied to the work material.

5. The milling method according to claim 1, wherein an amount of displacement in the axial direction per unit length along the moving direction in the radial direction in the milling by moving tool body closer to the work material in the axial direction while the tool body is moved in the radial direction is smaller than an amount of displacement in the axial direction per unit length along the moving direction in the radial direction in moving the tool body away from the work material in the axial direction while the tool body is moved in the radial direction after finishing facing entirely.

* * * * *